(12) United States Patent
Hayward et al.

(10) Patent No.: US 11,373,249 B1
(45) Date of Patent: Jun. 28, 2022

(54) AUTOMOBILE MONITORING SYSTEMS AND METHODS FOR DETECTING DAMAGE AND OTHER CONDITIONS

(71) Applicant: State Farm Mutual Automobile Insurance Company, Bloomington, IL (US)

(72) Inventors: Gregory L Hayward, Bloomington, IL (US); Meghan Sims Goldfarb, Bloomington, IL (US); Nicholas U. Christopulos, Bloomington, IL (US); Erik Donahue, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 437 days.

(21) Appl. No.: 16/136,357

(22) Filed: Sep. 20, 2018

Related U.S. Application Data

(60) Provisional application No. 62/652,121, filed on Apr. 3, 2018, provisional application No. 62/646,729, filed
(Continued)

(51) Int. Cl.
*G06Q 40/08* (2012.01)
*G06N 3/08* (2006.01)
(Continued)

(52) U.S. Cl.
CPC ............ *G06Q 40/08* (2013.01); *G06N 3/088* (2013.01); *G06V 20/00* (2022.01); *G06V 30/194* (2022.01)

(58) Field of Classification Search
None
See application file for complete search history.

(56) References Cited

U.S. PATENT DOCUMENTS 5,577,178 A 11/1996 Curry et al.
5,893,072 A 4/1999 Zizzamia
(Continued)

OTHER PUBLICATIONS

Alexander, "A Bag-of-Words Equivalent Recurrent Neural Network for Action Recognition", entire document, Mar. 23, 2017, https://arxiv.org/abs/1703.08089 (Year: 2017).*
(Continued)

*Primary Examiner* — Ryan D Donlon
*Assistant Examiner* — Mark A Malkowski
(74) *Attorney, Agent, or Firm* — Faegre Drinker Biddle & Reath LLP

(57) ABSTRACT

A method of determining damage to property includes inputting historical data into a machine learning model to identify an insured type, features, and/or characteristics. The method may include identifying a peril, repair and/or replacement cost of the vehicle by analyzing a digital image from a device of an insured, the digital image depicting damage to the vehicle. The method may include inputting the digital image into the trained machine learning model to identify a type, feature, and/or characteristic of the vehicle, and may include identifying a peril, repair, and/or replacement cost associated with the vehicle. A method may include receiving and/or retrieving free-form text associated with an insurance claim and/or a vehicle, identifying at least one key word composing the free-form text, and determining based on the at least one key word a cause of loss and/or peril that caused damage to the vehicle.

12 Claims, 12 Drawing Sheets

Related U.S. Application Data on Mar. 22, 2018, provisional application No. 62/646,740, filed on Mar. 22, 2018, provisional application No. 62/646,735, filed on Mar. 22, 2018, provisional application No. 62/632,884, filed on Feb. 20, 2018, provisional application No. 62/625,140, filed on Feb. 1, 2018, provisional application No. 62/622,542, filed on Jan. 26, 2018, provisional application No. 62/621,797, filed on Jan. 25, 2018, provisional application No. 62/621,218, filed on Jan. 24, 2018, provisional application No. 62/618,192, filed on Jan. 17, 2018, provisional application No. 62/617,851, filed on Jan. 16, 2018, provisional application No. 62/610,599, filed on Dec. 27, 2017, provisional application No. 62/580,655, filed on Nov. 2, 2017, provisional application No. 62/580,713, filed on Nov. 2, 2017, provisional application No. 62/564,055, filed on Sep. 27, 2017.

(51) Int. Cl.
   *G06V 20/00* (2022.01)
   *G06V 30/194* (2022.01)

(56) References Cited

U.S. PATENT DOCUMENTS

| | | | |
|---|---|---|---|
| 6,661,908 B1 | 12/2003 | Suchard et al. | |
| 7,149,347 B1 | 12/2006 | Wnek | |
| 7,249,114 B2 | 7/2007 | Burchetta et al. | |
| 7,392,201 B1 | 6/2008 | Binns et al. | |
| 7,958,066 B2 | 6/2011 | Pinckney et al. | |
| 7,966,282 B2 | 6/2011 | Pinckney et al. | |
| 8,452,621 B1 | 5/2013 | Leong et al. | |
| 8,595,037 B1 | 11/2013 | Hyde et al. | |
| 8,731,977 B1 | 5/2014 | Hardin et al. | |
| 9,025,756 B1 | 5/2015 | Graham et al. | |
| 9,552,681 B2 | 1/2017 | Burger | |
| 9,946,783 B1* | 4/2018 | Lewis | G06N 20/00 |
| 10,497,250 B1 | 12/2019 | Hayward et al. | |
| 10,783,585 B1* | 9/2020 | Banerjee | G06Q 40/08 |
| 10,832,347 B1 | 11/2020 | Westhues et al. | |
| 2002/0169710 A1 | 11/2002 | Morimoto | |
| 2003/0149603 A1 | 8/2003 | Ferguson et al. | |
| 2005/0075912 A1 | 4/2005 | Bealke et al. | |
| 2006/0015373 A1 | 1/2006 | Cuypers | |
| 2006/0136273 A1 | 6/2006 | Zizzamia et al. | |
| 2006/0293926 A1 | 12/2006 | Khury | |
| 2009/0287509 A1 | 11/2009 | Basak et al. | |
| 2010/0131304 A1 | 5/2010 | Collopy et al. | |
| 2010/0179961 A1* | 7/2010 | Berry | G06F 40/284 707/769 |
| 2010/0305977 A1 | 12/2010 | Hogan et al. | |
| 2011/0161115 A1* | 6/2011 | Hampton | G06Q 40/08 705/4 |
| 2012/0245439 A1 | 9/2012 | Andre et al. | |
| 2013/0254287 A1 | 9/2013 | Biswas et al. | |
| 2014/0129261 A1 | 5/2014 | Bothwell et al. | |
| 2014/0142989 A1 | 5/2014 | Grosso | |
| 2014/0195273 A1 | 7/2014 | Harnick et al. | |
| 2014/0201126 A1 | 7/2014 | Zadeh et al. | |
| 2014/0214696 A1 | 7/2014 | Laughlin et al. | |
| 2014/0322676 A1 | 10/2014 | Raman | |
| 2014/0379386 A1 | 12/2014 | Drennan, III | |
| 2015/0081578 A1 | 3/2015 | McLaughlin et al. | |
| 2015/0127389 A1 | 5/2015 | Blackman et al. | |
| 2015/0154712 A1* | 6/2015 | Cook | G06Q 40/08 705/4 |
| 2015/0235321 A1 | 8/2015 | Unser et al. | |
| 2015/0254719 A1 | 9/2015 | Barfield et al. | |
| 2015/0254766 A1 | 9/2015 | Abramowitz | |
| 2016/0086185 A1 | 3/2016 | Adjaoute | |
| 2016/0117778 A1 | 4/2016 | Costello et al. | |
| 2016/0127195 A1 | 5/2016 | Ripley et al. | |
| 2016/0171624 A1 | 6/2016 | Berg et al. | |
| 2016/0259994 A1 | 9/2016 | Ravindran et al. | |
| 2016/0267396 A1* | 9/2016 | Gray | G06N 20/00 |
| 2016/0335568 A1 | 11/2016 | Bailey et al. | |
| 2017/0021764 A1 | 1/2017 | Adams et al. | |
| 2017/0061330 A1* | 3/2017 | Kurata | G06N 3/084 |
| 2017/0091871 A1 | 3/2017 | Trainor et al. | |
| 2017/0103752 A1 | 4/2017 | Senior et al. | |
| 2017/0161758 A1 | 6/2017 | Towriss | |
| 2017/0185723 A1 | 6/2017 | McCallum et al. | |
| 2017/0221152 A1 | 8/2017 | Nelson et al. | |
| 2017/0242920 A1 | 8/2017 | Neland | |
| 2017/0262751 A1 | 9/2017 | Reddy et al. | |
| 2017/0270493 A1 | 9/2017 | Lugli et al. | |
| 2017/0270650 A1* | 9/2017 | Howe | G06K 9/6271 |
| 2017/0293894 A1* | 10/2017 | Taliwal | G06Q 10/20 |
| 2018/0225769 A1* | 8/2018 | Slusar | G06Q 40/08 |
| 2018/0268305 A1* | 9/2018 | Dhondse | G06F 16/219 |
| 2018/0292471 A1* | 10/2018 | Chen | G01S 19/26 |
| 2018/0300576 A1 | 10/2018 | Dalyac et al. | |
| 2018/0300638 A1 | 10/2018 | Chen et al. | |
| 2019/0014488 A1 | 1/2019 | Tan et al. | |
| 2019/0073641 A1 | 3/2019 | Utke | |
| 2019/0180395 A1 | 6/2019 | Moretti et al. | |
| 2019/0362430 A1 | 11/2019 | Jass | |

OTHER PUBLICATIONS

Goh, "Construction accident narrative classification", https://www.sciencedirect.com/science/article/pii/S0001457517303068, available online since Jan. 9, 2017 (click on "show more" on chevron) (Year: 2017).*

Tixier, "Automated content analysis for construction safety: A natural language processing system to extract precursors and outcomes from unstructured injury reports", https://www.sciencedirect.com/science/article/pii/S0926580515002265 (Year: 2015).*

Sameen, "Severity Prediction of Traffic Accidents with Recurrent Neural Networks", https://www.mdpi.com/2076-3417/7/6/476/pdf#:~:text=The%20NN%20model%20was%20used,of%20conventional%20data%20mining%20methods, Jun. 8, 2017 (Year: 2017).*

Bertke, "Development and evaluation of a Naïve Bayesian model for coding causation of workers' compensation claims", https://pubmed.ncbi.nlm.nih.gov/23206504/ , 2012 (Year: 2012).*

Wellman, "Classifying injury narratives of large administrative databases for surveillance", https://pubmed.ncbi.nlm.nih.gov/27863339/, Jan. 2017 (Year: 2017).*

Zhang, "A C-BiLSTM Approach to Classify Construction Accident Reports" https://www.mdpi.com/2076-3417/10/17/5754/htm (Year: 2020).*

Baillargeon, "Mining Actuarial Risk Predictors in Accident Descriptions Using Recurrent Neural Networks", https://www.mdpi.com/2227-9091/9/1/7/htm (Year: 2020).*

Yang, "Hierarchical Attention Networks for Document Classification", https://www.cs.cmu.edu/~./hovy/papers/16HLT-hierarchical-attention-networks.pdf, 2016 (Year: 2016).*

Worker's Compensation board, "Direct deposit and debit card authorization form", https://web.archive.org/web/20170212054310/http://www.wcb.ny.gov/content/main/forms/DD-1 .pdf (Year: 2017).

Amazon, "Amazon Machine Learning Developer Guide" https://web.archive.Org/web/20170821164055/https://docs.aws.amazon.com/machine-learning/latest/dg/machinelearning-dg.pdf (Year: 2017).

Wikipedia, "Supervised Learning", Sep. 26, 2017, Wlkipedia.com site: https://web.archive.org/web/20170926185716/https://en.wikipedia.org/wiki/SupervisedJearning#cite_note-1 (Year: 2017).

Bapat et al, "Development and Testing of an Efficient Artificial Neural Network Algorithm and [. . . ] Prediction of Insurance Claims", International Journal of Innovation, Management, and Technology, http://www.ijimt.org/papers/53-M446, pdf, 2010 (Year: 2010).

Guyon et al, "An Introduction to Variable and Feature Selection", Journal of Machine Learning Research, https://www.jmlr.org/papers/volume3/guyon03a/guyon03a.pdf, 2003 (Year: 2003).

(56) References Cited

OTHER PUBLICATIONS

Hua, et al., "A Brief Review of Machine Learning and its Application", 2009, Information Engineering Institute Capital Normal University, entire document pertinent (Year: 2009).

Treleaven, et al.. Computational Finance, published in IEEE Computer (vol. 43, Issue: 12, Dec. 2010), entire document pertinent (Year: 2010).

* cited by examiner

700

```
            Application for Vehicle Insurance

Owner:  Jane Q. Public
Primary Driver:  Jennifer Q. Public
Age:  16
Occupation:  Grocery Clerk
Address:  123 Oak St., Anytown USA
Tickets:  2
Accidents:  0
Purpose:  driving to school, soccer practice, and work.
Mileage:  1,028
VIN:  1HGCG56481A021211
```
← 710

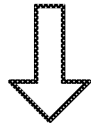

```
                        Labels
((YOUTH, 1.0),
 ((SUBURBAN, 1.0), (GARAGE-PARKING, 0.8)),
 (MOVING-VIOLATION, 0.9),
 ((ATHLETE, 0.9),(EMPLOYED, 0.9),(STUDENT, 0.9)),
 (BUSINESS-VEHICLE, 0.9),
 (COLLISION, 0.5),
 (DEER, 0.002),
 (LOW-MILEAGE, 0.9),
 ((LATE-MODEL,1.0),(DARK-COLOR,1.0),(MINIVAN,1.0)),)
```
← 720

*FIG. 7*

AUTOMOBILE MONITORING SYSTEMS AND METHODS FOR DETECTING DAMAGE AND OTHER CONDITIONS

CROSS-REFERENCE TO RELATED APPLICATIONS

This application claims priority to and the benefit of:

U.S. Application No. 62/564,055, filed Sep. 27, 2017 and entitled "REAL PROPERTY MONITORING SYSTEMS AND METHODS FOR DETECTING DAMAGE AND OTHER CONDITIONS;"

U.S. Application No. 62/580,655, filed Nov. 2, 2017 and entitled REAL PROPERTY MONITORING SYSTEMS AND METHODS FOR DETECTING DAMAGE AND OTHER CONDITIONS;"

U.S. Application No. 62/610,599, filed Dec. 27, 2017 and entitled "AUTOMOBILE MONITORING SYSTEMS AND METHODS FOR DETECTING DAMAGE AND OTHER CONDITIONS;"

U.S. Application No. 62/621,218, filed Jan. 24, 2018 and entitled "AUTOMOBILE MONITORING SYSTEMS AND METHODS FOR LOSS MITIGATION AND CLAIMS HANDLING;"

U.S. Application No. 62/621,797, filed Jan. 25, 2018 and entitled "AUTOMOBILE MONITORING SYSTEMS AND METHODS FOR LOSS RESERVING AND FINANCIAL REPORTING,"

U.S. Application No. 62/580,713, filed Nov. 2, 2017 and entitled "REAL PROPERTY MONITORING SYSTEMS AND METHODS FOR DETECTING DAMAGE AND OTHER CONDITIONS;"

U.S. Application No. 62/618,192, filed Jan. 17, 2018 and entitled "REAL PROPERTY MONITORING SYSTEMS AND METHODS FOR DETECTING DAMAGE AND OTHER CONDITIONS;"

U.S. Application No. 62/625,140, filed Feb. 1, 2018 and entitled "SYSTEMS AND METHODS FOR ESTABLISHING LOSS RESERVES FOR BUILDING/REAL PROPERTY INSURANCE;"

U.S. Application No. 62/646,729, filed Mar. 22, 2018 and entitled "REAL PROPERTY MONITORING SYSTEMS AND METHODS FOR LOSS MITIGATION AND CLAIMS HANDLING;"

U.S. Application No. 62/646,735, filed Mar. 22, 2018 and entitled "REAL PROPERTY MONITORING SYSTEMS AND METHODS FOR RISK DETERMINATION;"

U.S. Application No. 62/646,740, filed Mar. 22, 2018 and entitled "SYSTEMS AND METHODS FOR ESTABLISHING LOSS RESERVES FOR BUILDING/REAL PROPERTY INSURANCE;"

U.S. Application No. 62/617,851, filed Jan. 16, 2018 and entitled "IMPLEMENTING MACHINE LEARNING FOR LIFE AND HEALTH INSURANCE PRICING AND UNDERWRITING;"

U.S. Application No. 62/622,542, filed Jan. 26, 2018 and entitled "IMPLEMENTING MACHINE LEARNING FOR LIFE AND HEALTH INSURANCE LOSS MITIGATION AND CLAIMS HANDLING;"

U.S. Application No. 62/632,884, filed Feb. 20, 2018 and entitled "IMPLEMENTING MACHINE LEARNING FOR LIFE AND HEALTH INSURANCE LOSS RESERVING AND FINANCIAL REPORTING;"

U.S. Application No. 62/652,121, filed Apr. 3, 2018 and entitled "IMPLEMENTING MACHINE LEARNING FOR LIFE AND HEALTH INSURANCE CLAIMS HANDLING;"

the entire disclosures of which are hereby incorporated by reference herein in their entireties.

FIELD OF INVENTION

This disclosure generally relates to detecting damage, loss, and/or other conditions associated with an automobile and human passengers, operators, and/or pedestrians to determine risk levels for insurance to better and/or more efficiently match price to risk.

BACKGROUND

As computer and computer networking technology has become less expensive and more widespread, more and more devices have started to incorporate digital "smart" functionalities. For example, controls and sensors capable of interfacing with a network may now be incorporated into devices such as vehicles and/or traffic control systems. Furthermore, it is possible for one or more vehicle and/or central controllers to interface with the smart devices or sensors.

However, conventional systems may not be able to automatically detect and characterize various conditions or damage associated with a vehicle or building. Additionally, conventional systems may not be able to detect or sufficiently identify and describe damage that is hidden from human view, and that typically has to be characterized by explicit human physical exploration, extent and range of electrical malfunctions, etc. Conventional systems further may not be able to formulate precise characterizations of loss without including unconscious biases, and may not be able to equally weight all historical data in determining loss mitigation factors.

BRIEF SUMMARY

The present disclosure generally relates to systems and methods for detecting damage, loss, and/or other conditions associated with a vehicle using a computer system and/or a building, land, structure, or other real property using a property monitoring system. Embodiments of exemplary systems and computer-implemented methods are summarized below. The methods and systems summarized below may include additional, less, or alternate components, functionality, and/or actions, including those discussed elsewhere herein.

In one aspect, the present embodiments may relate to determining an automobile-based risk level via one or more processors, training a neural network to identify risk factors that are predictive electronic claim features, receiving information corresponding to (i) an automobile, and/or (ii) an automobile operator, analyzing the information using the trained neural network to generate one or more risk indicators, determining, by analyzing the risk indicators, a risk level corresponding to the automobile, and/or displaying, to a user, an insurance quotation based upon analyzing the risk indicators. The automobile may be a smart, autonomous, or semi-autonomous vehicle, and have sensors, software, and electronic components that direct autonomous or semi-autonomous vehicle features or technologies—each of which may have a various levels of risk, or lack thereof, that may be analyzed and determined by the present embodiments. Systems and methods may automatically generate risk models for various types of vehicle insurance types and loss types, such as by the application of artificial intelligence and machine learning methods as disclosed herein, to provide more granular risk models, leading to more accurate commercial offerings, and more appropriate matching premium price to actual risk.

In another aspect, a computer-implemented method of determining an automobile-based risk level via one or more processors may include training, via one or more processors, a neural network to identify risk factors that are predictive of electronic vehicle claim records. The neural network may include a plurality of layers, and an input layer from among the plurality of layers may include a plurality of input parameters—with each corresponding to a different claim attribute. The method may include, via one or more processors, receiving information corresponding to (i) an automobile, and/or (ii) an automobile operator; and analyzing the information using the trained neural network. Analyzing the information may include generating, within the plurality of layers, one or more risk indicators corresponding to the information. The method may also include determining a risk level corresponding to the vehicle. The method may include additional, less, or alternate actions, including those discussed elsewhere herein.

In another aspect, a computing system may include one or more processors, and one or more memories storing instructions. When the instructions are executed by the one or more processors, they may cause the computing system to provide a first application to a user of a client computing device. The first application, when executing on the client computing device, may cause the client computing device to obtain a set of information from an input device of the client computing device, and transmit, via a communication network interface of the client computing device, the set of information to a remote computing system. The instructions may cause the computing system to receive, at the remote computing system, the set of information and process, at the remote computing system, the set of information. The instructions may cause the computing system to identify, by the remote computing system, one or more risk indications, at least in part, by applying the set of information to a trained neural network and generate, by the remote computing system analyzing the one or more risk indications, a quotation, such as quote for auto insurance. The instructions may cause the computing system to (i) display the quotation to the user, and (ii) provide the quotation as input to a second application. The system may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 7 depicts a flow diagram of an exemplary computer-implemented method of identifying risk indicators from vehicle operator information, according to one embodiment;

Figure 1:
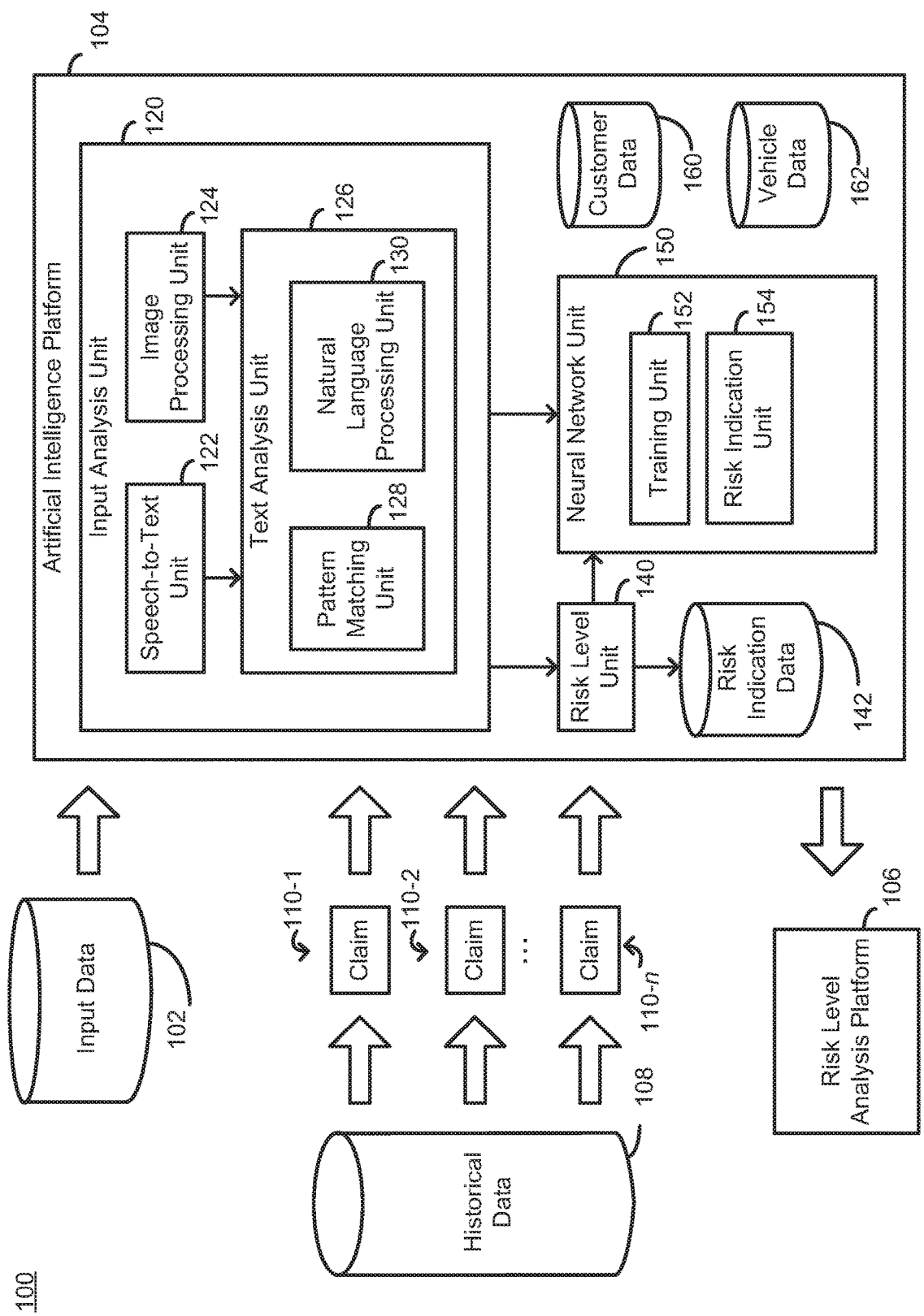
FIG. 1 depicts an exemplary computing environment in which techniques for training a neural network to identify a risk level of a vehicle may be implemented, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Artificial Intelligence Systems for Insurance

The present embodiments are directed to, inter alia, machine learning and/or training a model using historical automobile and/or home insurance claim data to discover risk levels and price automobile insurance accordingly. Systems and methods may include natural language processing of free-form notes/text, or free-form speech/audio, recorded by call center and/or claim adjustor, photos, and/or other evidence. The free-form text and/or free-form speech may also be received from a customer who is inputting the text or speech into a mobile device app or into a smart home controller or smart vehicle controller, and/or into a chat bot or robo-advisor.

Other inputs to a machine learning/training model may be harvested from historical claims may, and may include make, model, year, miles, technological features, and/or other characteristics of a vehicle, vehicle operation monitoring systems, whether a claim is paid or not paid, liability (e.g., types of injuries, where treated, how treated, etc.), disbursements related to claim such as hotel costs and other payouts, etc. Additional inputs to the machine learning/ training model may include vehicle telematics data for automobiles, and for real property, home telematics data received from a smart vehicle controller, such as how long and when are the doors unlocked, how often is the security system armed, how long is the vehicle in operation during time periods, etc.

The present embodiments may facilitate discovering new causes of loss that may be utilized to set pricing of insurance. The present embodiments may dynamically characterize insurance claims, and/or dynamically determine causes of loss associated with insurance claims, which may vary geographically. The present embodiments may also dynamically update pricing models to facilitate better matching insurance premium price to actual risk.

Artificial Intelligence System for Vehicle Insurance

Noted above, the present embodiments may also be directed to machine learning and/or training a model using historical auto claim data to discover risk levels, and then price vehicle insurance accordingly. The present embodiments may include natural language processing of free-form notes recorded by call center and/or claim adjustor (e.g., "hit a deer"), photos, and/or other evidence to use as input to machine learning/training model. Other inputs to a machine learning/training model may be harvested from historical claims, and may include make, model, year, claim paid or not paid, liability (e.g., types of injuries, where treated, how treated, etc.), disbursements related to the claim such as rental car and other payouts, etc.

Exemplary Environment for Identifying Risk Factors and Calculating Risk in Data

The embodiments described herein may relate to, inter alia, determining an accurate, granular vehicle insurance risk level corresponding to a plurality of inputs. More particularly, in some embodiments, one or more neural network models may be trained using historical claims data as training input. An application may be provided to a client computing device (e.g., a smartphone, tablet, laptop, desktop computing device, wearable, or other computing device) of a user. A user of the application, who may be an employee of a company employing the methods described herein or a customer of that company, may enter input into the application via a user interface or other means. The input may be transmitted from the client computing device to a remote computing device (e.g., one or more servers) via a computer network, and then processed further, including by applying input entered into the client to the one or more trained neural network models to produce labels and weights indicating net or individual risk factors. The risk factors may be identified in electronic claim records, and/or may be predictive of certain real-world risks. Although historical claims may be used in training one or more neural network models, electronic claims information may be streaming in realtime or with near-realtime latencies (e.g., on the order of 10 0ms or less) along with all input information to tune the artificial intelligence system, in a dynamic process.

For example, the remote computing device may receive the input and determine, using a trained neural network, one or more risk indicators applicable to the input, and/or a risk level. Herein risk indicators may be expressed numerically, as strings (e.g., as labels), or in any other suitable format. Risk levels may be expressed as Boolean values (e.g., risk/no risk), scaled quantities (e.g., from 0.0-1.0), or in any other suitable format. The determined risk indicators and/or risk level may be displayed to the user, and/or may be provided as input to another application (e.g., to an application which uses the risk indicators and calculated risk in a quotation calculation or for other purposes).

A quotation may include a price, parameters describing the vehicle, and/or one or more identified risk indicators, among other information. By transmitting input to the remote computing device for processing and analysis, an accurate risk level based upon a wealth of historical knowledge may be determined, and provided to the user in what may appear to the user to be a very rapid, even instantaneous, manner.

Turning to FIG. 1, an exemplary computing environment 100, representative of artificial intelligence platform for vehicle insurance, is depicted. Environment 100 may include input data 102 and historical data 108, both of which may comprise a list of parameters, a plurality (e.g., thousands or millions) of electronic documents, or other information. As used herein, the term "data" generally refers to information related to a vehicle operator, which exists in the environment 100. For example, data may include an electronic document representing a vehicle (e.g., automobile, truck, boat, motorcycle, etc.) insurance claim, demographic information about the vehicle operator and/or information related to the type of vehicle or vehicles being operated by the vehicle operator, and/or other information.

Data may be historical or current. Although data may be related to an ongoing claim filed by a vehicle operator, in some embodiments, data may consist of raw data parameters entered by a human user of the environment 100 or which is retrieved/received from another computing system.

Data may or may not relate to the claims filing process, and while some of the examples described herein refer to auto insurance claims, it should be appreciated that the techniques described herein may be applicable to other types of electronic documents, in other domains. For example, the techniques herein may be applicable to identifying risk factors in other insurance domains, such as agricultural insurance, homeowners insurance, health or life insurance, renters insurance, etc. In that case, the scope and content of the data may differ, in addition to the domain-specific training and operational requirements applicable to the neural network(s).

As another example, data may be collected from an existing customer filing a claim, a potential or prospective customer applying for an insurance policy, or may be supplied by a third party such as a company other than the proprietor of the environment 100. In some cases, data may reside in paper files that are scanned or entered into a digital format by a human or by an automated process (e.g., via a scanner). Generally, data may comprise any digital information, from any source, created at any time.

Input data 102 may be loaded into an artificial intelligence system 104 to organize, analyze, and process input data 102 in a manner that facilitates efficient determination of risk levels by risk level analysis platform 106. The loading of input data 102 may be performed by executing a computer program on a computing device that has access to the environment 100, and the loading process may include the computer program coordinating data transfer between input data 102 and AI platform 104 (e.g., by the computer program providing an instruction to AI platform 104 as to an address or location at which input data 102 is stored).

AI platform may reference this address to retrieve records from input data 102 to perform risk level determination techniques. AI platform 104 may be thought of as a collection of algorithms configured to receive and process parameters, and to produce labels and, in some embodiments, risk and/or pricing information.

As discussed below with respect to FIGS. 3, 4, and 5; AI platform 104 may be used to train multiple neural network models relating to different granular segments of vehicle operators. For example, AI platform 104 may be used to train a neural network model for use by operators of autonomous vehicles who are over the age of 30. In another embodiment, AI platform 104 may be used to train a neural network model for use in predicting risk of motorcycle operators in a particular state or locality. The precise manner in which neural networks are created and trained is described below.

In the embodiment of FIG. 1, AI platform 104 may include claim analysis unit 120. Claim analysis unit 120 may include speech-to-text unit 122 and image analysis unit 124 which may comprise, respectively, algorithms for converting human speech into text and analyzing images (e.g., extracting information from hotel and rental receipts). In this way, data may comprise audio recordings (e.g., recordings made when a customer telephones a customer service center) that may be converted to text and further used by AI platform 104. In some embodiments, customer behavior represented in data-including the accuracy and truthfulness of a customer—may be encoded by claim analysis unit 120 and used by AI platform 104 to train and operate neural network models.

Claim analysis unit 120 may also include text analysis unit 126, which may include pattern matching unit 128 and natural language processing (NLP) unit 130. In some embodiments, text analysis unit 126 may determine facts regarding claim inputs (e.g., the amount of money paid under a claim). Amounts may be determined in a currency- and inflation-neutral manner, so that claim loss amounts may be directly compared. In some embodiments, text analysis unit 126 may analyze text produced by speech-to-text unit 122 or image analysis unit 124.

In some embodiments, pattern matching unit 128 may search textual claim data loaded into AI platform 104 for specific strings or keywords in text (e.g., "hit a deer") which may be indicative of particular types of risk. NLP unit 130 may be used to identify, for example, entities or objects indicative of risk (e.g., that an injury occurred to a person, and that the person's leg was injured). NLP unit 130 may identify human speech patterns in data, including semantic information relating to entities, such as people, vehicles, homes, and other objects.

Relevant verbs and objects, as opposed to verbs and objects of lesser relevance, may be determined by the use of a machine learning algorithm analyzing historical claims. For example, both a driver and a deer may be relevant objects. Verbs indicating collision or injury may be relevant verbs. In some embodiments, text analysis unit 126 may comprise text processing algorithms (e.g., lexers and parsers, regular expressions, etc.) and may emit structured text in a format which may be consumed by other components.

In the embodiment of FIG. 1, AI platform 104 may include a risk level unit 140 to determine risk based upon analysis of data. Risk may be calculated with respect to individual attributes or elements of data, such as by assigning a risk score between 0 and 1 to a given attribute (e.g., deer). In other embodiments, risk level unit 140 may determine an indication of risk by generating labels which pertain to data in whole or in part. This labeling may be accomplished in various different ways, depending on the embodiment.

For example, risk level unit 140 may label input data 102, or portions thereof, according to positive or negative pattern matching according to pattern matching unit 128. For example, if input data 102 matches the pattern "hit [a] deer," wherein the article "a" is optional, then input data 102 may receive labels such as (ACCIDENT, DEER) or (COLLISION, ANIMAL). Alternately, in some embodiments, risk level unit 140 may label input data 102, which may be raw data or a claim filed by a customer, according to results obtained from natural language processing unit 130 (e.g., LIMB-INJURY). Risk level unit 140 may label input data 102 according to Boolean values (e.g., PAID/NOT-PAID) or pre-determined ranges (e.g., claims having a payout of $0-$50,000; $50,000-$500,000; $500,000-$1,000,000; or >=$1,000,000).

Labels may be saved to and/or retrieved from an electronic database, such as risk indication data 142, and claim labels may be generated from already-existing labels, and/or dynamically created labels (i.e., labels created at runtime) by risk level unit 140. A set of labels may be associated with a set of input data 102, and the creation of new labels may be partially or entirely based upon existing labels and/or input data 102.

Dynamic creation of labels may, in some embodiments, be based upon user attributes and/or metadata. For example, a resident of the Eastern United States may be assigned a label related to weather or another attribute unique to the region; for example, a hurricane- or flood-related label.

As noted, in some embodiments, risk level unit 140 may analyze input data 102 (e.g., label claims) through the use of a neural network unit 150. Neural network unit 150 may use an artificial neural network, or simply "neural network." The neural network may be any suitable type of neural network, including, without limitation, a recurrent neural network or feed-forward neural network. The neural network may include any number (e.g., thousands) of nodes or "neurons" arranged in multiple layers, with each neuron processing one or more inputs to generate a decision or other output.

In some embodiments, neural network models may be chained together, so that output from one model is fed into another model as input. For example, risk level unit 140 may, in one embodiment, apply input data 102 to a first neural network model that is trained to generate labels. The output (e.g., labels) of this first neural network model may be fed as input to a second neural network model which has been trained to predict claim settlement amounts based upon the presence of labels. The second neural network may be trained using an inflation-adjusted set of claim payout amounts, and respective set of risk labels, to very accurately predict the amount of money likely to be paid on a new claim, given only a new set of risk labels from the first model.

Neural network unit 150 may include training unit 152, and risk indication unit 154. To train the neural network to identify risk, neural network unit 150 may access electronic claims within historical data 108. Historical data 108 may comprise a corpus of documents comprising many (e.g., millions) of insurance claims which may contain data linking a particular customer or claimant to one or more vehicles, and which may also contain, or be linked to, information pertaining to the customer. In particular, historical data 108 may be analyzed by AI platform 104 to generate claim records 110-1 through 110-*n*, where n is any positive integer. Each claim 110-1 through 110-*n* may be processed by training unit 152 to train one or more neural networks to identify claim risk factors, including by pre-processing of historical data 108 using input analysis unit 120 as described above.

Neural network 150 may, from a trained model, identify labels that correspond to specific data, metadata, and/or attributes within input data 102, depending on the embodiment. For example, neural network 150 may be provided with instructions from input analysis unit 120 indicating that one or more particular type of insurance is associated with one or more portions of input data 102.

Neural network 150 may identify one or more insurance types associated with the one or more portions of input data 102 (e.g., bodily injury, property damage, collision coverage, comprehensive coverage, liability insurance, med pay, or personal injury protection (PIP) insurance) and by input analysis unit 120. In one embodiment, the one or more insurance types may be identified by training the neural network 150 based upon types of peril. For example, the neural network model may be trained to determine that fire, theft, or vandalism may indicate comprehensive insurance coverage.

In addition, input data 102 may indicate a particular customer and/or vehicle. In that case, risk level unit 140 may look up additional customer and/or vehicle information from customer data 160 and vehicle data 162, respectively. For example, the age of the vehicle operator and/or vehicle type may be obtained. The additional customer and/or vehicle information may be provided to neural network unit 150 and may be used to analyze and label input data 102 and, ultimately, may be used to determine risk. For example, neural network unit 150 may be used to predict risk based upon inputs obtained from a person applying for an auto insurance policy, or based upon a claim submitted by a person who is a holder of an existing insurance policy. That is, in some embodiments where neural network unit 150 is trained on claim data, neural network unit 150 may predict risk based upon raw information unrelated to the claims filing process, or based upon other data obtained during the filing of a claim (e.g., a claim record retrieved from historical data 108).

In one embodiment, the training process may be performed in parallel, and training unit 152 may analyze all or a subset of claims 110-1 through 110-*n*. Specifically, training unit 152 may train a neural network to identify claim risk factors in claim records 110-1 through 110-*n*. As noted, AI platform 104 may analyze input data 102 to arrange the historical claims into claim records 110-1 through 110-*n*, where n is any positive integer.

Claim records 110-1 through 110-*n* may be organized in a flat list structure, in a hierarchical tree structure, or by means of any other suitable data structure. For example, the claim records may be arranged in a tree wherein each branch of the tree is representative of one or more customer. There, each of claim records 110-1 through 110-*n* may represent a single non-branching claim, or may represent multiple claim records arranged in a group or tree.

Further, claim records 110-1 through 110-*n* may comprise links to customers and vehicles whose corresponding data is located elsewhere. In this way, one or more claims may be associated with one or more customers and one or more vehicles via one-to-many and/or many-to-one relationships. Risk factors may be data indicative of a particular risk or risks associated with a given claim, customer, and/or vehicle. The status of claim records may be completely settled or in various stages of settlement.

As used herein, the term "claim" or "vehicle claim" generally refers to an electronic document, record, or file, that represents an insurance claim (e.g., an automobile insurance claim) submitted by a policy holder of an insurance company. Herein, "claim data" or "historical data" generally refers to data directly entered by the customer or insurance company including, without limitation, free-form text notes, photographs, audio recordings, written records, receipts (e.g., hotel and rental car), and other information including data from legacy, including pre-Internet (e.g., paper file), systems. Notes from claim adjusters and attorneys may also be included. Claim data may include data entered by third parties, such as information from a repair shop, hospital, doctor, police report, etc.

In one embodiment, claim data may include claim metadata or external data, which generally refers to data pertaining to the claim that may be derived from claim data or which otherwise describes, or is related to, the claim but may not be part of the electronic claim record. Claim metadata may have been generated directly by a developer of the environment 100, for example, or may have been automatically generated as a direct product or byproduct of a process carried out in environment 100. For example, claim metadata may include a field indicating whether a claim was settled or not settled, and amount of any payouts, and the identity of corresponding payees.

Another example of claim metadata is the geographic location in which a claim is submitted, which may be obtained via a global positioning system (GPS) sensor in a device used by the person or entity submitting the claim. Yet another example of claim metadata includes a category of the claim type (e.g., collision, liability, uninsured or underinsured motorist, etc.). For example, a single claim in historical data 108 may be associated with a married couple, and may include the name, address, and other demographic information relating to the couple. Additionally, the claim may be associated with multiple vehicles owned or leased by the couple, and may contain information pertaining to those vehicles including without limitation, the vehicles' make, model, year, condition, mileage, etc.

The claim may include a plurality of claim data and claim metadata, including metadata indicating a relationship or linkage to other claims in historical claim data 108. In this way, neural network unit 150 may produce a neural network that has been trained to associate the presence of certain input parameters with higher or lower risk levels. A specific example of a claim is discussed with respect to FIG. 5, below.

Once the neural network has been trained, risk indication unit 154 may apply the trained neural network to input data 102 as processed by input analysis unit 120. In one embodiment, input analysis unit 120 may merely "pass through" input data 102 without modification. The output of the neural network, indicating risk indications, such as labels pertaining to the entirety of, or portions of input data 102, may then be provided to risk level unit 140. Risk level unit 140 may insert the output of the neural network (e.g., labels) into an electronic database, such as risk indication data 142. Alternatively, or additionally, risk indication unit 154 may use label information output by the neural network to determine attributes of input data 102, and may provide those attributes to risk level unit 140.

In some embodiments, each label or attribute may be associated with a confidence score and/or weight. Confidence scores may be assigned based upon the source of the information (e.g., if the information is from vehicle data 274, then a score of 1.0 may be assigned; whereas, if the information is inferred and/or provided by a user, a lower confidence score may be assigned). Risk level unit 140 may then forward the labels and/or scores to risk level analysis platform 106. In some embodiments, determining a single label may require neural network unit 150 to analyze several attributes within input data 102. For example, a new customer applying for an auto insurance policy may be required to provide their name, make and model of their car, and a scanned copy of their driver's abstract to determine a risk that is reflective of all three pieces of information. Some models may include validation that will produce an error state if a required piece of information is not provided.

AI platform 104 may further include customer data 160 and vehicle data 162, which risk level unit 140 may leverage to provide useful input parameters to neural network unit 150. Customer data 160 may be an integral part of AI platform 104, or may be located separately from AI platform 104. In some embodiments, customer data 160 or vehicle data 162 may be provided to AI platform 104 via separate means (e.g., via an API call), and may be accessed by other units or components of environment 100. Either may be provided by a third-party service.

Vehicle data 162 may be a database comprising information describing vehicle makes and models, including information about model years and model types (e.g., model edition information, engine type, any upgrade packages, etc.). Vehicle data 162 may indicate whether certain make and model year vehicles are equipped with safety features (e.g., lane departure warnings). The vehicle data 162 may also relate to autonomous or semi-autonomous vehicle features or technologies of the vehicle, and/or sensors, software, and electronic components that direct the autonomous or semi-autonomous vehicle features or technologies.

Both of customer data 160 and vehicle data 162 may be used to train a neural network model. For example, to continue the above new customer application example, risk level unit 140 may look up the applicant's age and other demographic information in customer data 160, and may obtain from vehicle data 162 the knowledge that the car is a convertible. Further, the driver abstract may be analyzed by image processing unit 124 and pattern matching unit 128, which—together—may determine that the applicant's driver's license was suspended within the prior year.

All of the information pertaining to the applicant may then be provided to neural network unit 150, which may—based upon its prior training on claims from historical data 108—determine that a plurality of labels apply to the applicant. For example, the labels may include SUSPENDED, CONVERTIBLE, YOUTH. As noted, the labels may have a respective confidence factor, and may be sorted in terms of criticality, and/or given pre-assigned weights. The labels and/or weights may be stored in risk indication data 142, in an embodiment. It should be appreciated that the use of additional vehicle labels (e.g., DIESEL, V8, MANUAL-TRANSMISSION, REVOKED) is envisioned in label generation.

In some embodiments, pattern matching unit 128 and natural language processing unit 130 may act in conjunction to determine labels. For example, pattern matching unit 128 may include instructions to identify words indicating contact (e.g., "hit", "crash", or "collide"). Matched data may be provided to natural language processing unit 130, which may further process the matched data to determine parts of speech such as verbs and objects, as well as relationships between the objects.

The output of natural language processing unit 130 may be provided to neural network unit 150 and used by training unit 152 to train a neural network model to label insurance types. For example, if natural language processing unit 152 indicates a collision with an inanimate object, such as a fence, pole, or otherwise, then the neural network may generate a label of COLLISION, indicating that the input data 102 may indicate a collision insurance policy. On the other hand, if natural language processing unit 152 indicates a collision with an animal, such as a deer, then the neural network may generate a label of COMPREHENSIVE.

It should be appreciated that in this example, the two labels (COLLISION and COMPREHENSIVE) are not mutually exclusive. That is, the neural network model may generate multiple labels corresponding to an indication by pattern matching unit 128 and/or natural language processing unit 130 that both types of insurance coverage are indicated. Further, additional processing, including by the use of an additional neural network model, maybe used to assign weight to a label. For example, a collision involving a deer may receive a higher weight than one involving a rabbit.

The labels in risk indication data 142 may be provided to risk level analysis platform which may perform a calculation using the labels and/or weights. For example, in one embodiment, risk level analysis platform 106 may sum the weights and scale the price of a policy offered to the applicant. In other embodiments, the risk level analysis platform 106 may apply a cut-off level, beyond which no policy may be offered. In yet another embodiment, a maximum and/or minimum weight may be computed, and used to scale a base price.

A maximum or minimum weight may correspond to a local maximum (e.g., the longest trip taken by a given driver), a global maximum (e.g., the vehicle operator in a vehicle operator cohort with the most claims filed in a five-year period), or a maximum among a set of vehicle operators. It should be appreciated that there are many possibilities for using the information generated by the neural network.

In some embodiments, labels may be associated with pre-set weights that are stored separately from AI platform 104, and which may be updated independently. It should also be appreciated that the methods and techniques described herein may not be applied to seek profit in an insurance marketplace. Rather, the methods and techniques may be used to more fairly and equitably allocate risk among customers in a way that is revenue-neutral, yet which strives for fairness to all market participants, and may only be used on an opt-in basis.

Historically, claim losses may be categorized using loss cause codes. These may be a handful of mutually-exclusive labels or categories into which claims are categorized that only permit coarse analysis of risk.

The methods and systems described herein may help risk-averse customers to lower their insurance premiums by more granularly quantifying risk. The methods and systems may also allow new customers to receive more accurate pricing when they are shopping for vehicle insurance products. All of the benefits provided by the methods and systems described herein may be realized much more quickly than traditional modeling approaches. The methods and systems herein may reduce, in some cases dramatically, insurance company expenses and/or insurance customer premiums, due to increased efficiencies and improved predictive accuracies.

Exemplary Training Model System

Figure 2:
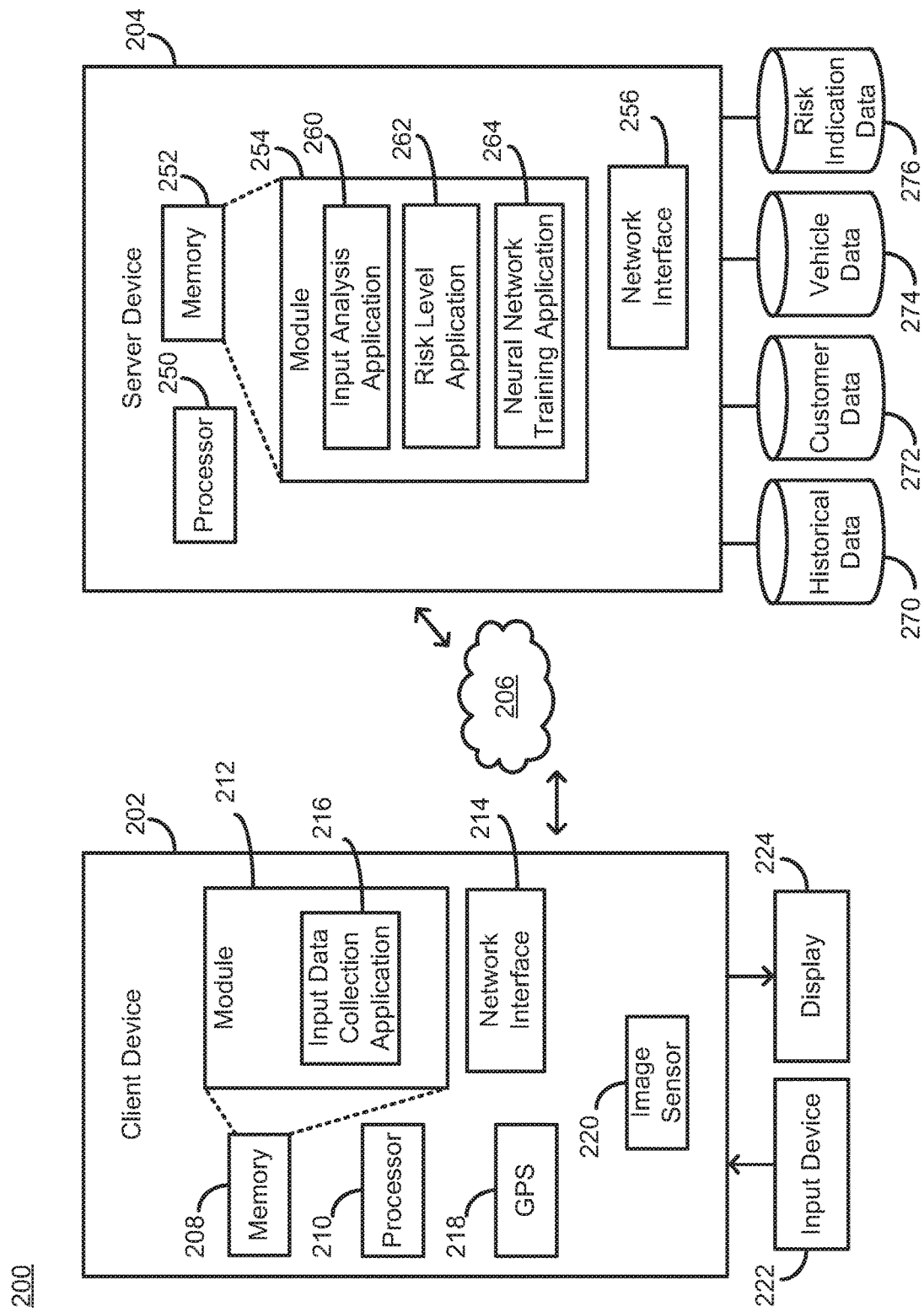
FIG. 2 depicts an exemplary computing environment in which techniques for collecting and processing user input, and training a neural network to identify a risk level of a vehicle may be implemented, according to one embodiment.

With reference to FIG. 2, a high-level block diagram of vehicle insurance risk training model system 200 is illustrated that may implement communications between a client device 202 and a server device 204 via network 206 to provide vehicle insurance loss classification and/or risk level analysis. FIG. 2 may correspond to one embodiment of environment 100 of FIG. 1, and also includes various user/client-side components. For simplicity, client device 202 is referred to herein as client 202, and server device 204 is referred to herein as server 204, but either device may be any suitable computing device (e.g., a laptop, smart phone, tablet, server, wearable device, etc.). Server 204 may host services relating to neural network training and operation, and may be communicatively coupled to client 202 via network 206.

Although only one client device is depicted in FIG. 2, it should be understood that any number of client devices 202 may be supported. Client device 202 may include a memory 208 and a processor 210 for storing and executing, respectively, a module 212. While referred to in the singular, processor 210 may include any suitable number of processors of one or more types (e.g., one or more CPUs, graphics processing units (GPUs), cores, etc.). Similarly, memory 208 may include one or more persistent memories (e.g., a hard drive and/or solid state memory).

Module 212, stored in memory 208 as a set of computer-readable instructions, may be related to an input data collection application 216 which, when executed by the processor 210, causes input data to be stored in memory 208. The data stored in memory 208 may correspond to, for example, raw data retrieved from input data 102. Input data collection application 216 may be implemented as web page (e.g., HTML, JavaScript, CSS, etc.) and/or as a mobile application for use on a standard mobile computing platform.

Input data collection application 216 may store information in memory 208, including the instructions required for its execution. While the user is using input data collection application 216, scripts and other instructions comprising input data collection application 216 may be represented in memory 208 as a web or mobile application. The input data collected by input data collection application 216 may be stored in memory 208 and/or transmitted to server device 204 by network interface 214 via network 206, where the input data may be processed as described above to determine a series of risk indications and/or a risk level. In one embodiment, input data collection application 216 may be data used to train a model (e.g., scanned claim data).

Client device 202 may also include GPS sensor 218, an image sensor 220, user input device 222 (e.g., a keyboard, mouse, touchpad, and/or other input peripheral device), and display interface 224 (e.g., an LED screen). User input device 222 may include components that are integral to client device 202, and/or exterior components that are communicatively coupled to client device 202, to enable client device 202 to accept inputs from the user. Display 224 may be either integral or external to client device 202, and may employ any suitable display technology. In some embodiments, input device 222 and display 224 are integrated, such as in a touchscreen display. Execution of the module 212 may further cause the processor 210 to associate device data collected from client 202 such as a time, date, and/or sensor data (e.g., a camera for photographic or video data) with vehicle and/or customer data, such as data retrieved from customer data 160 and vehicle data 162, respectively.

In some embodiments, client 202 may receive data from risk indication data 142 and risk level analysis platform 106. Such data, indicating risk labels and/or a risk level computation, may be presented to a user of client 202 by a display interface 224.

Execution of the module 212 may further cause the processor 210 of the client 202 to communicate with the processor 250 of the server 204 via network interface 214 and network 206. As an example, an application related to module 212, such as input data collection application 216, may, when executed by processor 210, cause a user interface to be displayed to a user of client device 202 via display interface 224. The application may include graphical user input (GUI) components for acquiring data (e.g., photographs) from image sensor 220, GPS coordinate data from GPS sensor 218, and textual user input from user input device(s) 222.

The processor 210 may transmit the aforementioned acquired data to server 204, and processor 250 may pass the acquired data to a neural network, which may accept the acquired data and perform a computation (e.g., training of the model, or application of the acquired data to a trained neural network model to obtain a result). With specific reference to FIG. 1, the data acquired by client 202 may be transmitted via network 206 to a server implementing AI platform 104, and may be processed by input analysis unit 120 before being applied to a trained neural network by risk level unit 140.

As described with respect to FIG. 1, the processing of input from client 202 may include associating customer data 160 and vehicle data 162 with the acquired data. The output of the neural network may be transmitted, by a risk level unit corresponding to risk level unit 140 in server 204, back to client 202 for display (e.g., in display 224) and/or for further processing.

Network interface 214 may be configured to facilitate communications between client 202 and server 204 via any hardwired or wireless communication network, including network 206 which may be a single communication network, or may include multiple communication networks of one or more types (e.g., one or more wired and/or wireless local area networks (LANs), and/or one or more wired and/or wireless wide area networks (WANs) such as the Internet). Client 202 may cause insurance risk related data to be stored in server 204 memory 252 and/or a remote insurance related database such as customer data 160.

Server 204 may include a processor 250 and a memory 252 for executing and storing, respectively, a module 254. Module 254, stored in memory 252 as a set of computer-readable instructions, may facilitate applications related to processing and/or collecting insurance risk related data, including claim data and claim metadata, and insurance policy application data. For example, module 254 may include input analysis application 260, risk level application 262, and neural network training application 264, in one embodiment.

Input analysis application 260 may correspond to input analysis unit 120 of environment 100 of FIG. 1. Risk level application 262 may correspond to risk level unit 140 of environment of FIG. 1, and neural network training application 264 may correspond to neural network unit 150 of environment 100 of FIG. 1. Module 254 and the applications contained therein may include instructions which, when executed by processor 250, cause server 204 to receive and/or retrieve input data from (e.g., raw data and/or an electronic claim) from client device 202. In one embodiment, input analysis application 260 may process the data from client 202, such as by matching patterns, converting raw text to structured text via natural language processing, by extracting content from images, by converting speech to text, and so on.

Throughout the aforementioned processing, processor 250 may read data from, and write data to, a location of memory 252 and/or to one or more databases associated with server 204. For example, instructions included in module 254 may cause processor 250 to read data from an historical data 270, which may be communicatively coupled to server device 204, either directly or via communication network 206. Historical data 270 may correspond to historical data 108, and processor 250 may contain instructions specifying analysis of a series of electronic claim documents from historical data 270, as described above with respect to claims 110-1 through 110-*n* of historical data 108 in FIG. 1.

Processor 250 may query customer data 272 and vehicle 274 for data related to respective electronic claim documents and raw data, as described with respect to FIG. 1. In one embodiment customer data 272 and vehicle data 274 correspond, respectively, customer data 160 and 162. In another embodiment, customer data 272 and/or vehicle data 274 may not be integral to server 204. Module 254 may also facilitate communication between client 202 and server 204 via network interface 256 and network 206, in addition to other instructions and functions.

Although only a single server 204 is depicted in FIG. 2, it should be appreciated that it may be advantageous in some embodiments to provision multiple servers for the deployment and functioning of AI system 102. For example, the pattern matching unit 128 and natural language processing unit 130 of input analysis unit 120 may require CPU-intensive processing. Therefore, deploying additional hardware may provide additional execution speed. Each of historical data 270, customer data 272, vehicle data 274, and risk indication data 276 may be geographically distributed.

While the databases depicted in FIG. 2 are shown as being communicatively coupled to server 204, it should be understood that historical claim data 270, for example, may be located within separate remote servers or any other suitable computing devices communicatively coupled to server 204. Distributed database techniques (e.g., sharding and/or partitioning) may be used to distribute data. In one embodiment, a free or open source software framework such as Apache Hadoop® may be used to distribute data and run applications (e.g., risk level application 262). It should also be appreciated that different security needs, including those mandated by laws and government regulations, may in some cases affect the embodiment chosen, and configuration of services and components.

In a manner similar to that discussed above in connection with FIG. 1, historical claims from historical claim data 270 may be ingested by server 204 and used by neural network training application 264 to train an artificial neural network. Then, when module 254 processes input from client 202, the data output by the neural network(s) (e.g., data indicating labels, risks, weights, etc.) may be passed to risk level application 262 for computation of an overall risk level, which as discussed, may be expressed in boolean, decimal, or any other suitable format. The calculated risk level may then be transmitted to client device 202 and/or another device. The calculated risk level may be used for further processing by client device 202, server device 204, or another device.

It should be appreciated that the client/server configuration depicted and described with respect to FIG. 2 is but one possible embodiment. In some cases, a client device such as client 202 may not be used. In that case, input data may be entered—programmatically, or manually—directly into device 204. A computer program or human may perform such data entry. In that case, device may contain additional or fewer components, including input device(s) and/or display device(s).

The most useful embodiment may vary according to the purpose for which the AI platform is being utilized—for example, a different hardware configuration may be preferable if the AI platform is being used to provide a risk analysis to an end user or customer, whereas another embodiment may be preferable if the AI platform is being used to provide risk as part of a backend service. Furthermore, it may be possible to package the trained neural network for distribution to a client 202 (i.e., the trained neural network may be operated on the client 202 without the use of a server 204).

In operation, the user of client device 202, by operating input device 222 and viewing display 224, may open input data collection application 216, which depending on the embodiment, may allow the user to enter personal information. The user may be an employee of a company controlling AI platform 104 or a customer or end user of the company. For example, input data collection application 216 may walk the user through the steps of submitting a claim.

Before the user can fully access input data collection application 216, the user may be required to authenticate (e.g., enter a valid username and password). The user may then utilize input data collection application 216. Module 212 may contain instructions that identify the user and cause input data collection application 216 to present a particular set of questions or prompts for input to the user, based upon any information input data collection application 216 collects, including without limitation information about the user or any vehicle.

Further, module 212 may identify a subset of historical data 270 to be used in training a neural network, and/or may indicate to server device 204 that the use of a particular neural network model or models is appropriate. For example, if the user is applying for liability vehicle insurance on a particular make and model year car, then module 212 may transmit the user's name and personal information, the location of the user as provided by GPS 218, a photograph of the vehicle to be insured captured by image sensor 220; and the make, model, and year of the vehicle to server device 204.

In some embodiments, location data from client device 202 may be used by a neural network to label risk, and labels may be linked, in that a first label implies a second label. As noted above, location may be provided to one or more neural networks in the AI platform to generate labels and determine risk. For example, the zip code of a vehicle operator, whether provided via GPS or entered manually by a user, may cause the neural network to generate a label applicable to the vehicle operator such as RURAL, SUBURBAN, or URBAN.

Such qualifications may be used in the calculation of risk, and may be weighted accordingly. For example, the neural network may assign a higher risk weight to the RURAL label, due to the increased likelihood of collision with animals. Due to the increased risk of collision with animals, the generation of a RURAL label may be accompanied by additional labels such as COLLISION. Alternatively, or in addition, the collision label weight may be increased along with the addition of the RURAL label.

Another label, such as LONG-TRIP, to reflect that the vehicle operator drives longer trips than other drivers, on average, may be associated with vehicle operators who the neural network labels as RURAL. In some embodiments, label generation may be based upon seasonal information, in whole or in part. For example, the neural network may generate labels, and/or adjust label weights based upon location provided in input data. The trained neural network model may learn to associate drivers who drive in the city in summer with higher risk.

All other inputs being equal, vehicle operator risk may differ based upon the time of year when the vehicle operator is applying for insurance. It should be appreciated that the quick and automatic generation of such associations is a benefit of the methods and systems disclosed herein, and that some of the associations may appear counter-intuitive when analyzing large data sets.

By the time the user of client 202 submits an application for vehicle insurance or files a claim, server 204 may have already processed the electronic claim records in historical data 270 and trained a neural network model to analyze the information provided by the user to output risk indications, labels, and/or weights.

For example, the operator of a 2012 Jeep Cherokee may access client 202 to submit a claim under the driver's collision insurance policy related to damage to the vehicle sustained while the driver was on vacation in a state other than the driver's home state. Client 202 may collect information from the vehicle operator related to the circumstances of the collision, in addition to demographic information of the vehicle operator, including location and photographs from GPS 218 and image sensor 220, respectively. In some embodiments, the vehicle operator may be prompted to make a telephone call to discuss the filing of the claim, which may be recorded and later provided to server 204.

All of the information collected may be associated with a claim identification number so that it may be referenced as a whole. Server 204 may process the information as it arrives, and thus may process information collected by input data collection application 216 at a different time than server 204 processes the audio recording in the above example. Once information sufficient to process the claim has been collected, server 204 may pass all of the processed information (e.g., from input analysis application) to risk level application 262, which may apply the information to the trained neural network model.

While the claim or application processing is pending, client device 202 may display an indication that the processing of the claim is ongoing and/or incomplete. When the claim is ultimately processed by server 204, an indication of completeness may be transmitted to client 202 and displayed to user, for example via display 224. Missing information may cause the model to abort with an error.

In some embodiments, the labels and/or characterization of input data (claims and otherwise) performed by the systems and methods described herein may be capable of dynamic, incremental, and or online training. Specifically, a model that has been trained on a set of electronic claim records from historical data 270 may be updated dynamically, such that the model may be updated on a much shorter time scale. For example, the model may be adjusted weekly or monthly to take into account newly-settled claims.

In one embodiment, the settlement of a claim may trigger an immediate update of one or more neural network models included in the AI platform. For example, the settlement of a claim involving personal injury that occurs on a boat may trigger updates to a set of personal injury neural network models pertaining to boat insurance. In addition, or alternatively, as new claims are filed and processed, new labels may be dynamically generated, based upon risks identified and generated during the training process. In some embodiments, a human reviewer or team of reviewers may be responsible for approving the generated labels and any associated weightings before they are used.

In some embodiments, AI platform 104 may be trained and/or updated to provide one or more dynamic insurance rating models which may be provided to, for example, a governmental agency. As discussed above, models are historically difficult to update and updates may be performed on a yearly basis. Using the techniques described herein, models may be dynamically updated in real-time, or on a shorter schedule (e.g., weekly) based upon new claim data.

While FIG. 2 depicts a particular embodiment, the various components of environment 100 may interoperate in a manner that is different from that described above, and/or the environment 100 may include additional components not shown in FIG. 2. For example, an additional server/platform may act as an interface between client device 202 and server device 204, and may perform various operations associated with providing the labeling and/or risk analysis operations of server 204 to client device 202 and/or other servers.

Exemplary Artificial Neural Network

Figure 3:
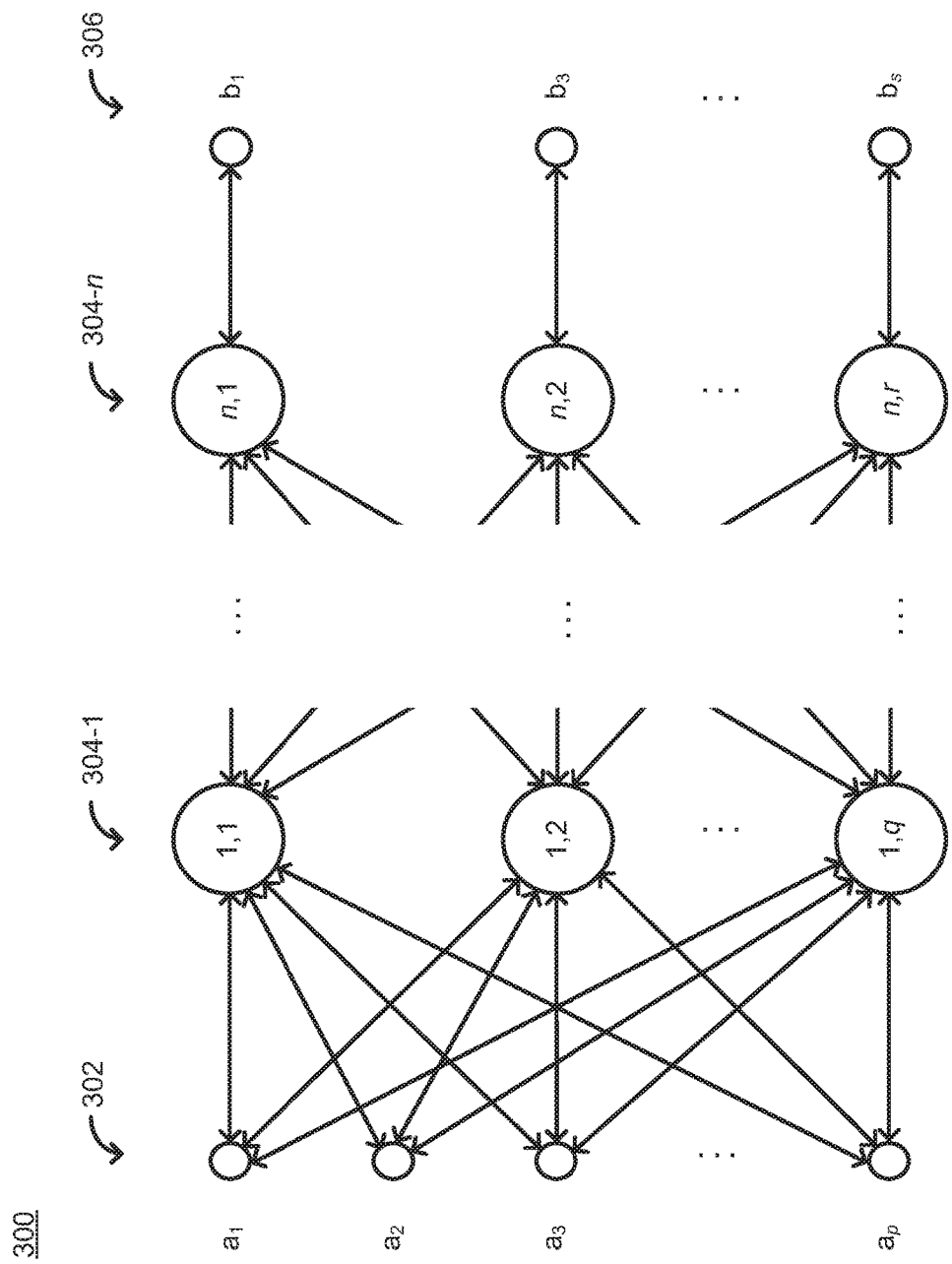
FIG. 3 depicts an exemplary artificial neural network which may be trained by the neural network unit of FIG. 1 or the neural network training application of FIG. 2, according to one embodiment and scenario.

FIG. 3 depicts an exemplary artificial neural network 300 which may be trained by neural network unit 150 of FIG. 2 or neural network training application 264 of FIG. 2, according to one embodiment and scenario. The example neural network 300 may include layers of neurons, including input layer 302, one or more hidden layers 304-1 through 304-$n$, and output layer 306. Each layer comprising neural network 300 may include any number of neurons—i.e., q and r may be any positive integers. It should be understood that neural networks may be used to achieve the methods and systems described herein that are of a different structure and configuration than those depicted in FIG. 3.

Input layer 302 may receive different input data. For example, input layer 302 may include a first input $a_1$ which represents an insurance type (e.g., collision), a second input $a_2$ representing patterns identified in input data, a third input $a_3$ representing a vehicle make, a fourth input $a_4$ representing a vehicle model, a fifth input $a_5$ representing whether a claim was paid or not paid, a sixth input $a_6$ representing an inflation-adjusted dollar amount disbursed under a claim, and so on. Input layer 302 may comprise thousands or more inputs. In some embodiments, the number of elements used by neural network 300 may change during the training process, and some neurons may be bypassed or ignored if, for example, during execution of the neural network, they are determined to be of less relevance.

Each neuron in hidden layer(s) 304-1 through 304-$n$ may process one or more inputs from input layer 302, and/or one or more outputs from a previous one of the hidden layers, to generate a decision or other output. Output layer 306 may include one or more outputs each indicating a label, confidence factor, and/or weight describing one or more inputs. A label may indicate the presence (ACCIDENT, DEER) or absence (DROUGHT) of a condition. In some embodiments, however, outputs of neural network 300 may be obtained from a hidden layer 304-1 through 304-$n$ in addition to, or in place of, output(s) from output layer(s) 306.

In some embodiments, each layer may have a discrete, recognizable, function with respect to input data. For example, if n=3, a first layer may analyze one dimension of inputs, a second layer a second dimension, and the final layer a third dimension of the inputs, where all dimensions are analyzing a distinct and unrelated aspect of the input data. For example, the dimensions may correspond to aspects of a vehicle operator considered strongly determinative, then those that are considered of intermediate importance, and finally those that are of less relevance.

In other embodiments, the layers may not be clearly delineated in terms of the functionality they respectively perform. For example, two or more of hidden layers 304-1 through 304-n may share decisions relating to labeling, with no single layer making an independent decision as to labeling.

In some embodiments, neural network 300 may be constituted by a recurrent neural network, wherein the calculation performed at each neuron is dependent upon a previous calculation. It should be appreciated that recurrent neural networks may be more useful in performing certain tasks, such as automatic labeling of images. Therefore, in one embodiment, a recurrent neural network may be trained with respect to a specific piece of functionality with respect to environment 100 of FIG. 1. For example, in one embodiment, a recurrent neural network may be trained and utilized as part of image processing unit 124 to automatically label images.

Figure 4:
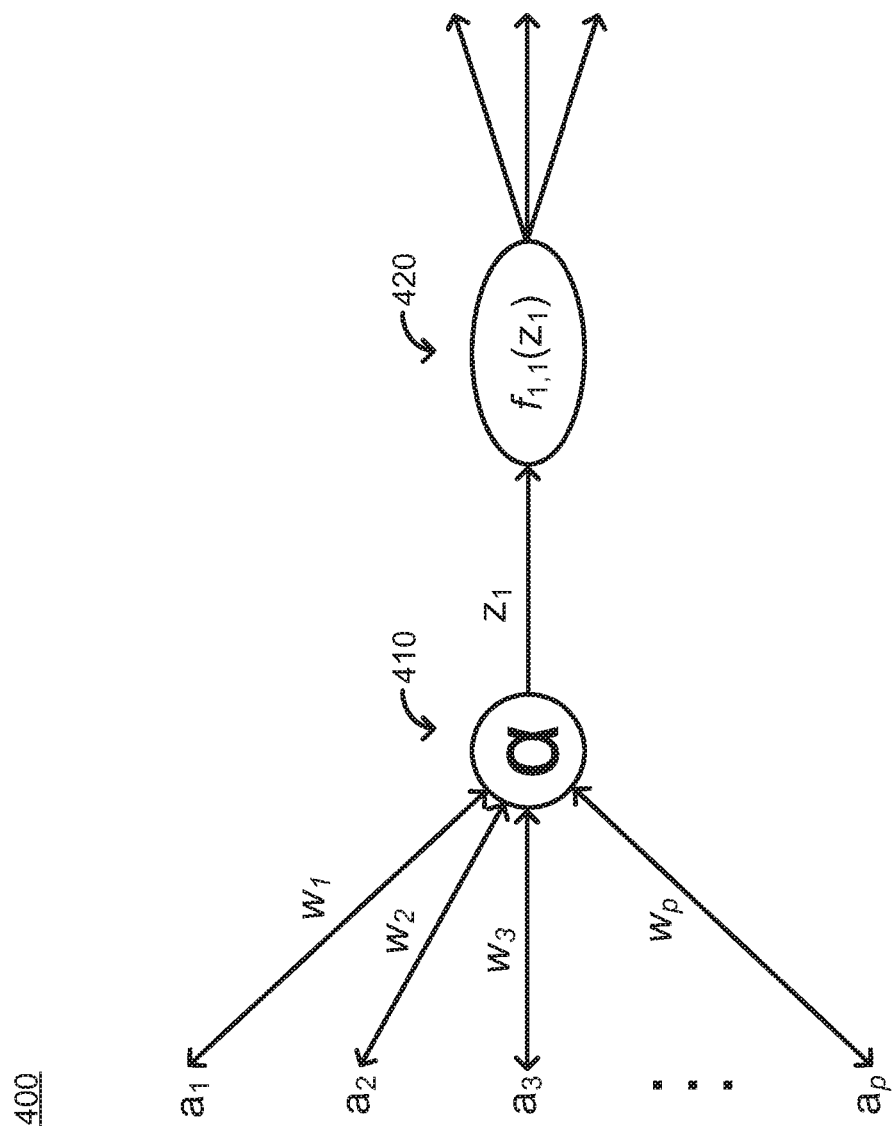
FIG. 4 depicts an exemplary neuron, which may be included in the artificial neural network of FIG. 3, according to one embodiment and scenario.

FIG. 4 depicts an example neuron 400 that may correspond to the neuron labeled as "1,1" in hidden layer 304-1 of FIG. 3, according to one embodiment. Each of the inputs to neuron 400 (e.g., the inputs comprising input layer 302) may be weighted, such that input $a_1$ through $a_p$ corresponds to weights $w_1$ through $w_p$, as determined during the training process of neural network 300.

In some embodiments, some inputs may lack an explicit weight, or may be associated with a weight below a relevant threshold. The weights may be applied to a function α, which may be a summation and may produce a value $z_1$ which may be input to a function 420, labeled as $f_{1,1}(z_1)$. The function 420 may be any suitable linear or non-linear, or sigmoid, function. As depicted in FIG. 4, the function 420 may produce multiple outputs, which may be provided to neuron(s) of a subsequent layer, or used directly as an output of neural network 300. For example, the outputs may correspond to index values in a dictionary of labels, or may be calculated values used as inputs to subsequent functions.

It should be appreciated that the structure and function of the neural network 300 and neuron 400 depicted are for illustration purposes only, and that other suitable configurations may exist. For example, the output of any given neuron may depend not only on values determined by past neurons, but also future neurons.

Exemplary Processing of a Claim

The specific manner in which the one or more neural networks employ machine learning to label and/or quantify risk may differ depending on the content and arrangement of training documents within the historical data (e.g., historical data 108 of FIG. 1 and historical data 270 of FIG. 2) and the input data provided by customers or users of the AI platform (e.g., input data 102 of FIG. 1 and the data collected by input data collection application 216 of FIG. 2), as well as the data that is joined to the historical data and input data, such as customer data 160 of FIG. 1 and customer data 272 of FIG. 2, and customer data 160 of FIG. 1 and vehicle data 274 of FIG. 2.

The initial structure of the neural networks (e.g., the number of neural networks, their respective types, number of layers, and neurons per layer, etc.) may also affect the manner in which the trained neural network processes the input and claims. Also, as noted above, the output produced by neural networks may be counter-intuitive and very complex. For illustrative purposes, intuitive and simplified examples will now be discussed in connection with FIG. 5.

Figure 5:
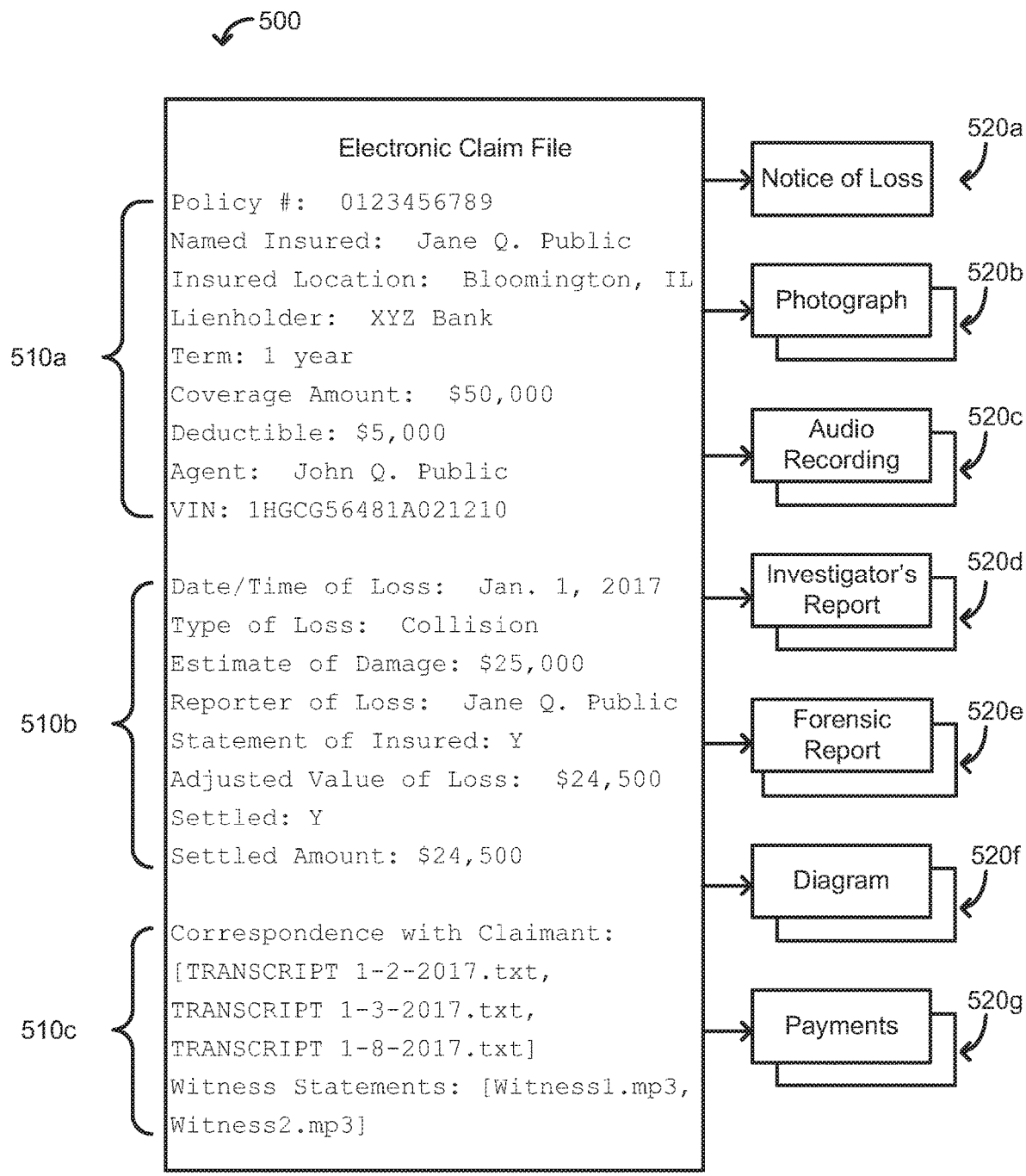
FIG. 5 depicts text-based content of an exemplary electronic claim record that may be processed by an artificial neural network, in one embodiment.

FIG. 5 depicts text-based content of an example electronic claim record 500 which may be processed using an artificial neural network, such as neural network 300 of FIG. 3 or a different neural network generated by neural network unit 150 of FIG. 1 or neural network training application 264 of FIG. 2. The term "text-based content" as used herein includes printing (e.g., characters A-Z and numerals 0-9), in addition to non-printing characters (e.g., whitespace, line breaks, formatting, and control characters). Text-based content may be in any suitable character encoding, such as ASCII or UTF-8 and text-based content may include HTML.

Although text-based-content is depicted in the embodiment of FIG. 5, as discussed above, claim input data may include images, including hand-written notes, and the AI platform may include a neural network trained to recognize hand-writing and to convert hand-writing to text. Further, "text-based content" may be formatted in any acceptable data format, including structured query language (SQL) tables, flat files, hierarchical data formats (e.g., XML, JSON, etc) or as other suitable electronic objects. In some embodiments, image and audio data may be fed directly into the neural network(s) without being converted to text first.

With respect to FIG. 5, electronic claim record 500 includes three sections 510a-510c, which respectively represent policy information, loss information, and external information. Policy information 510a may include information about the insurance policy under which the claim has been made, including the person to whom the policy is issued, the name of the insured and any additional insureds, the location of the insured, etc. Policy information 510a may be read, for example by input analysis unit 120 analyzing historical data such as historical data 108 and individual claims, such as claims 110-1 through 110-n. Similarly, vehicle information may be included in policy information 510a, such as a vehicle identification number (VIN).

Additional information about the insured and the vehicle (e.g., make, model, and year of manufacture) may be obtained from data sources and joined to input data. For example, additional customer data may be obtained from customer data 160 or customer data 272, and additional vehicle data may be obtained from vehicle data 162 and vehicle data 274. In some embodiments, make and model information may be included in electronic claim record 500, and the additional lookup may be of vehicle attributes (e.g., the number of passengers the vehicle seats, the available options, etc.).

In addition to policy information 510a, electronic claim record 500 may include loss information 510b. Loss information generally corresponds to information regarding a loss event in which a vehicle covered by the policy listed in policy information 510a sustained loss, and may be due to an accident or other peril. Loss information 510b may indicate the date and time of the loss, the type of loss (e.g., whether collision, comprehensive, etc.), whether personal injury occurred, whether the insured made a statement in connection with the loss, whether the loss was settled, and if so for how much money.

In some embodiments, more the than one loss may be represented in loss information 510b. For example, a single accident may give rise to multiple losses under a given policy, for example to two vehicles involved in a crash operated by vehicle operators not covered under the policy. In addition to loss information, electronic claim record 500 may include external information 510*c*, including but not limited to correspondence with the vehicle operator, statements made by the vehicle operator, etc. External information 510*c* may be textual, audio, or video information. The information may include file name references, or may be file handles or addresses that represent links to other files or data sources, such as linked data 520*a-g*. It should be appreciated that although only links 520*a-g* are shown, more or fewer links may be included, in some embodiments.

Electronic claim record 500 may include links to other records, including other electronic claim records. For example, electronic claim record 500 may link to notice of loss 520*a*, one or more photographs 520*b*, one or more audio recordings 520*c*, one or more investigator's reports 520*d*, one or more forensic reports 520*e*, one or more diagrams 520*f*, and one or more payments 520*g*. Data in links 520*a-520g* may be ingested by an AI platform such as AI platform 120. For example, as described above, each claim may be ingested and analyzed by input analysis unit 120.

AI platform 104 may include instructions which cause input analysis unit 120 to retrieve, for each link 520*a-520g*, all available data or a subset thereof. Each link may be processed according to the type of data contained therein; for example, with respect to FIG. 1, input analysis unit 120 may process, first, all images from one or more photograph 520*b* using image processing unit 124. Input analysis unit 120 may process audio recording 520*c* using speech-to-text unit 122.

In some embodiments, a relevance order may be established, and processing may be completed according to that order. For example, portions of a claim that are identified as most dispositive of risk may be identified and processed first. If, in that example, they are dispositive of pricing, then processing of further claim elements may be abated to save processing resources. In one embodiment, once a given number of labels is generated (e.g., 50) processing may automatically abate.

Once the various input data comprising electronic claim record 500 has been processed, the results of the processing may, in one embodiment, be passed to a text analysis unit, and then to neural network. If the AI platform is being trained, then the output of input analysis unit 120 may be passed directly to neural network unit 150. The neurons comprising a first input layer of the neural network being trained by neural network unit 150 may be configured so that each neuron receives particular input(s) which may correspond, in one embodiment, to one or more pieces of information from policy information 510*a*, loss information 510*b*, and external information 510*c*.

Similarly, one or more input neurons may be configured to receive particular input(s) from links 520*a-520g*. If the AI platform is being used to accept input to predict a claim value during the claims filing process, or to estimate the risk posed by a new customer during the application process, then the processing may begin with the use of an input collection application, as discussed with respect to one embodiment in FIG. 2.

In some embodiments, analysis of input entered by a user may be performed on a client device, such as client device 202. In that case, output from input analysis may be transmitted to a server, such as server 204, and may be passed directly as input to neurons of an already-trained neural network, such as a neural network trained by neural network training application 264.

In one embodiment, the value of a new claim may be predicted directly by a neural network model trained on historical data 108, without the use of any labeling. For example, a neural network may be trained such that input parameters correspond to, for example, policy information 510*a*, loss information 512*b*, external information 512*c*, and linked information 520*a-520g*.

The trained model may be configured so that inputting sample parameters, such as those in the example electronic claim record 500, may accurately predict, for example, the estimate of damage ($25,000) and settled amount ($24,500). In this case, random weights may be chosen for all input parameters.

The model may then be provided with training data from claims 110-1 through 110-*n*, which are each pre-processed by the techniques described herein with respect to FIGS. 1 and 2 to extract individual input parameters. The electronic claim record 500 may then be tested against the model, and the model trained with new training data claims, until the predicted dollar values and the correct dollar values converge.

In one embodiment, the AI platform may modify the information available within an electronic claim record. For example, the AI platform may predict a series of labels as described above that pertain to a given claim. The labels may be saved in a risk indication data store, such as risk indication data 142 with respect to FIG. 1. Next, the labels and corresponding weights, in one embodiment, may be received by risk level analysis platform 106, where they may be used in conjunction with base rate information to predict a claim loss value.

In some embodiments, information pertaining to the claim, such as the coverage amount and vehicle type from policy information 510*a*, may be passed along with the labels and weights to risk analysis platform 106 and may be used in the computation of a claim loss value. After the claim loss value is computed, it may be associated with the claim, for example by writing the amount to the loss information section of the electronic claim record (e.g., to the loss information section 510*b* of FIG. 5).

As noted above, the methods and systems described herein may be capable of analyzing decades of electronic claim records to build neural network models, and the formatting of electronic claim records may change significantly from decade to decade, even year to year. Therefore, it is important to recognize that the flexibility built into the methods and systems described herein allows electronic claim records in disparate formats to be consumed and analyzed.

Exemplary Computer-Implemented Methods

Figure 6:
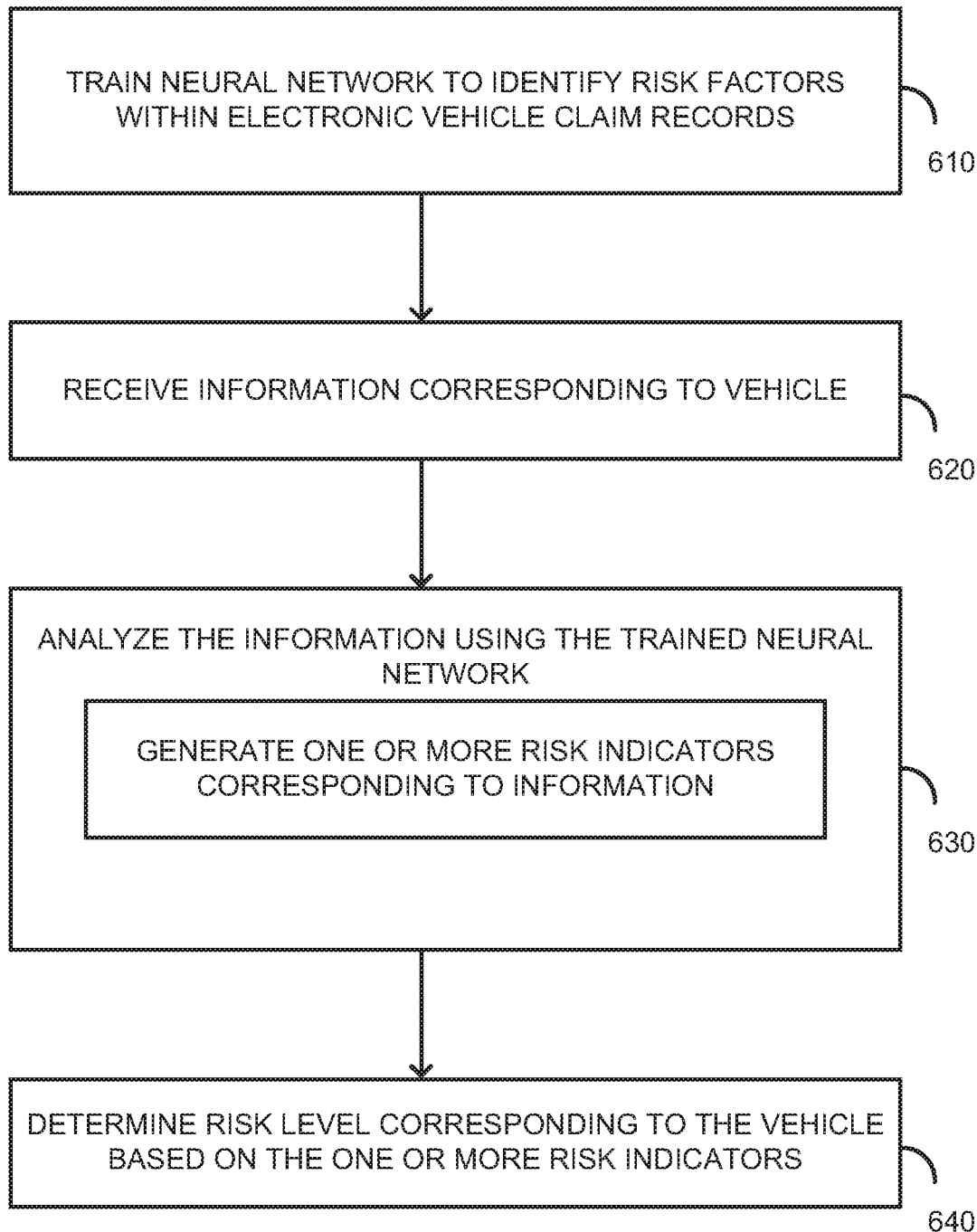
FIG. 6 depicts a flow diagram of an exemplary computer-implemented method of determining a risk level posed by an operator of a vehicle, according to one embodiment.

Turning to FIG. 6, an exemplary computer-implemented method 600 for determining a risk level posed by an operator of a vehicle is depicted. The method 600 may be implemented via one or more processors, sensors, servers, transceivers, and/or other computing or electronic devices. The method 600 may include training a neural network to identify risk factors that are predictive of electronic vehicle claim records (e.g., by an AI platform such as AI platform 104 training a neural network by an input analysis unit 120 processing data before passing the results of the analysis to a training unit 152 that uses the results to train a neural network model) (block 610). The method 600 may include receiving information corresponding to the vehicle by an AI platform (e.g., the AI platform 104 may accept input data such as input data 102 and may process that input by the use of an input analysis unit such as input analysis unit 120) (block 620). The method 600 may include analyzing the information using the trained neural network (e.g., a risk indication unit 154 applies the output of the input analysis unit 120 to trained neural network model) to generate one or more risk indicators corresponding to the information (e.g., the neural network produces a plurality of labels and/or corresponding weights) (block 630) which are used to determine a risk level corresponding to the vehicle based upon the one or more risk indicators (e.g., risk indications are stored in risk indication data 142, and/or passed to risk level analysis platform 106 for computation of a risk level, which may be based upon weights also generated by the trained neural network) (block 640). The method may include additional, less, or alternate actions, including those discussed elsewhere herein.

Turning to FIG. 7, a flow diagram for an exemplary computer-implemented method 700 of determining risk indicators from vehicle operator information. The method 700 may be implemented by a processor (e.g., processor 250) executing, for example, a portion of AI platform 104, including input analysis unit 120, pattern matching unit 128, natural language processing unit 130, and neural network unit 150. In particular, the processor 220 may execute an input data collection application 216 and an input device 222 to cause the processor 225 to acquire application input 710 from a user of a client 202.

The processor 220 may further execute the input data collection application 216 to cause the processor 220 to transmit application input 710 from the user via network interface 214 and a network 206 to a server (e.g., server 204). Processor 250 of server 204 may cause module 254 of server 204 to process application input 710. Input analysis application 260 may analyze application input 710 according to the methods describe above. For example, vehicle information may be queried from a vehicle data such as vehicle data 274. A VIN number in application input 710 may be provided as a parameter to vehicle data 274.

Vehicle data 274 may return a result indicating that a corresponding vehicle was found in vehicle data 274, and that it is a gray minivan that is one year old. Similarly, the purpose provided in application input 710 may be provided to a natural language processing unit (e.g., NLP unit 130), which may return a structured result indicating that the vehicle is being driven by a person who is an employed student athlete. The result of processing the application input 710 may be provided to a risk level unit (e.g., risk level unit 140) which will apply the input parameters to a trained neural network model.

In one embodiment, the trained neural network model may produce a set of labels and confidence factors 720. The set of labels and confidence factors 720 may contain labels that are inherent in the application input 710 (e.g., LOW-MILEAGE) or that are queried based upon information provided in the application input 710 (e.g., MINIVAN, based upon VIN). However, the set of labels and confidence factors 720 may include additional labels (e.g., COLLISION and DEER) that are not evident from the application input 710 or any related/queried information. After being generated by the neural network, the set of labels and confidence factors 720 may then be saved to an electronic database such as risk indication data 276, and/or passed to a risk level analysis platform 106, whereupon a total risk may be computed and used in a pricing quote provided to the user of client 202.

It should be appreciated that many more types of information may be extracted from the application input 710 (e.g., from example links 520a-520g as shown in FIG. 5). In one embodiment, the pricing quote may be a weighted average of the products of label weights and confidences. The method 700 may be implemented, for example, in response to a vehicle operator accessing client 202 for the purpose of applying for an insurance policy, or adding (via an application) an additional insured to an existing policy. The method may include additional, less, or alternate actions, including those discussed elsewhere herein.

Figure 8:
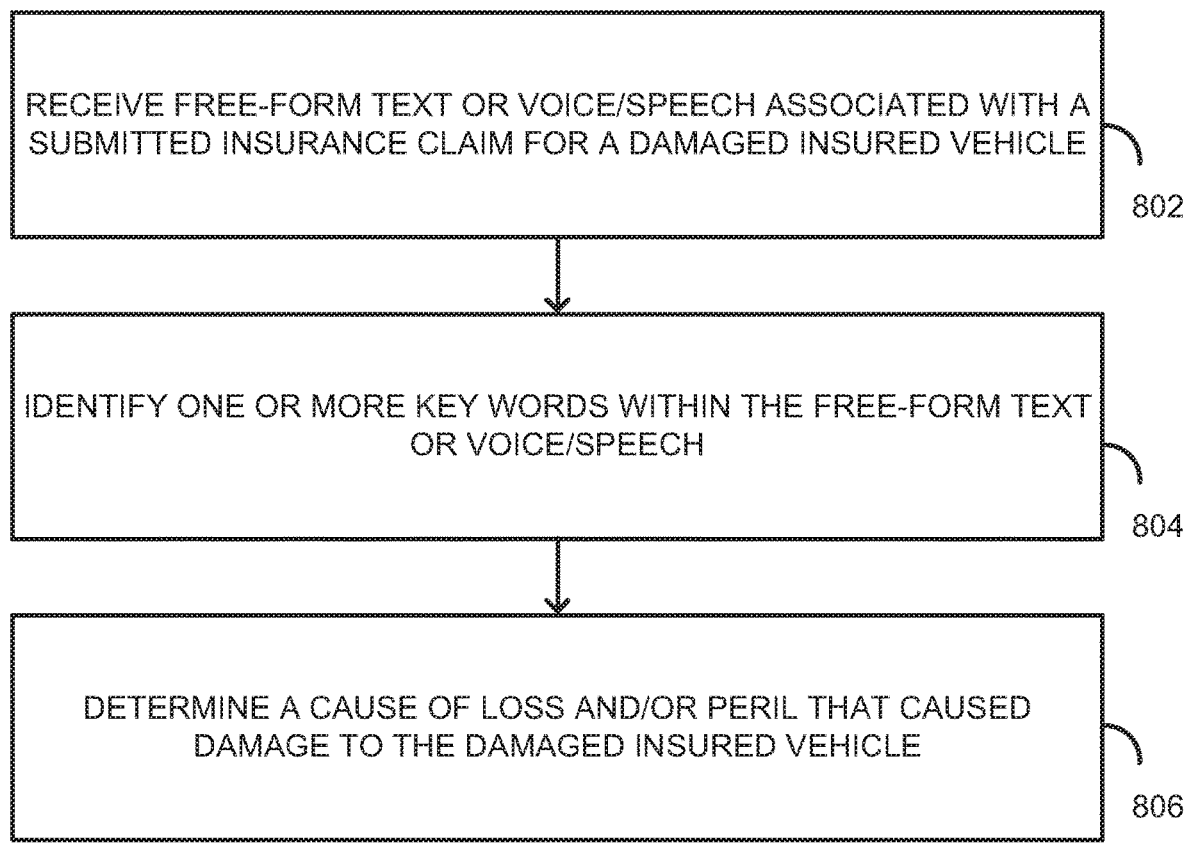
FIG. 8 is a flow diagram depicting an exemplary computer-implemented method of detecting and/or estimating damage to personal property, according to one embodiment.

With respect to FIG. 8, a flow diagram for an exemplary computer-implemented method 800 of detecting and/or estimating damage to personal property is depicted, according to an embodiment. The method 800 may be implemented, for instance, by a processor (e.g., processor 250) executing, for example, a portion of AI platform 104, including input analysis unit 120, pattern matching unit 128, natural language processing unit 130, and neural network unit 150. In particular, the processor 250 may execute an input analysis application 260 to cause processor 250 to receive free-form text or voice/speech associated with a submitted insurance claim for a damaged insured vehicle (block 802). The method may include identifying one or more key words within the free-form text or voice/speech (block 804). The identification of key words within free-form text may be performed by a module of AI platform 104 (e.g., by text analysis unit 126, pattern matching unit 128, and/or natural language processing unit 130). The identification of key words within voice/speech may be performed by, for example, speech-to-text unit 122. The method may further include determining a cause of loss and/or peril that caused damage to the damaged insured vehicle (block 806). A cause of loss and/or peril may be chosen from a set of causes of loss known to the insurer (e.g., a set stored in risk indication data 142) or may be identified or generated by risk indication unit 154.

In some embodiments, the free-form text may be associated with a webpage or user interface of a client device accessed by a customer or employee of the proprietor of AI system 104 (e.g., an insurance agent) or by a user interface of an intranet page accessed by an employee of a call center. For example, the free-form text may be entered by a person utilizing input device 222 and display 224 of client device 202, and the input may be caused to be collected by processor 210 executing instructions in input data collection application 216. Voice/speech of a user may be collected by processor 210 causing instructions in input data collection 216 to be executed which read audio signals from an input device such as a microphone. In one embodiment, free-form text or voice/speech may be input to server device 204 via other means (e.g., directly loaded onto server device 204). In some embodiments, a neural network may be trained (e.g., by neural network training unit 264) to identify, or determine, a key word (or words) associated with a cause of loss and/or peril using free-form text or voice/speech and a type corresponding to the insured vehicle as training data. For example, multiple neural networks may be trained that individually correspond to multiple different respective vehicle types and sets of free-form text or voice/speech.

In one embodiment, the machine learning algorithms may be dynamically or continuously trained (i.e., trained online) to dynamically update a set of key words associated with respective cause of loss and/or peril information. The cause of loss and/or peril information may be similarly dynamically updated. Such a dynamic set may be stored and updated in an electronic database, such as risk indication data 276.

In one embodiment, a first cause of loss and/or first a peril may be identified, and an image may be received. For example, a user may capture an image, e.g., a digital image, of a vehicle (e.g., a vehicle that is damaged and/or insured) via image sensor 220, or other type of camera. The image may be collected by module 212 and transmitted via network interface 214 and network 206 to network interface 256, whereupon the image may be analyzed by input analysis application 260. The image may be input to neural network unit 150 and passed to a trained neural network model or algorithm, which may analyze the image determine a second cause of loss and/or second peril. Then, the first cause of loss and/or peril (e.g., that were identified in a free-form submission, such as a claim) may be compared to the second cause of loss and/or peril corresponding to the image, to verify the accuracy of the submitted claim and/or to identify potential fraud or inflation of otherwise legitimate claims. In some embodiments the image received via image sensor 220 may be analyzed to estimate damages, in terms of cost and/or severity. Repair and replacement cost may be determined, in one embodiment, by training a neural network model to accept an image of a damaged vehicle, and to output an estimate of the severity or cost of damages, repair, and/or replacement cost. Such models may be trained using the methods described herein including, without limitation, using a subset of historical data 108 as training data.

In some embodiments, an insurance policy associated with the damaged insured vehicle may be received or retrieved. The cause of loss and/or peril may be analyzed to determine whether the cause of loss and/or peril are covered under the insurance policy. For example, a user of client device 202 may be required to login to an application in module 212 using a username or password. The user may be prompted to upload an image of a damaged vehicle during the claims submission process by the application in module 212, and the user may do so by capturing an image of a damaged vehicle the user owns via image sensor 220. The image, and an indication of the user's identity, may be transmitted via network 206 to server device 204.

Server device 204 may determine the cause of loss as described above by analyzing the image, and may retrieve an insurance policy corresponding to the user by querying, for example, customer data 272. Server 204 may contain instructions that cause the cause of loss or peril associated with the uploaded image to be analyzed in light of the insurance policy. The insurance policy may be machine readable, such that the cause of loss and peril information is directly comparable to the insurance policy.

In one embodiment, another means of comparison may be employed (e.g., a deep learning or Bayesian approach). Server 204, or more precisely an application executing in server 204, may then determine whether or not, or to what extent, the cause of loss associated with the image captured by the user is covered under the user's insurance policy. In one embodiment, an indication of the coverage may be transmitted to the user (e.g., via network 206). The causes of loss, perils, and key words/concepts that may be identified and/or determined by the above-described methods include, without limitation: collision, comprehensive, bodily injury, property damage, liability, medical, rental, towing, and ambulance.

Figure 9A:
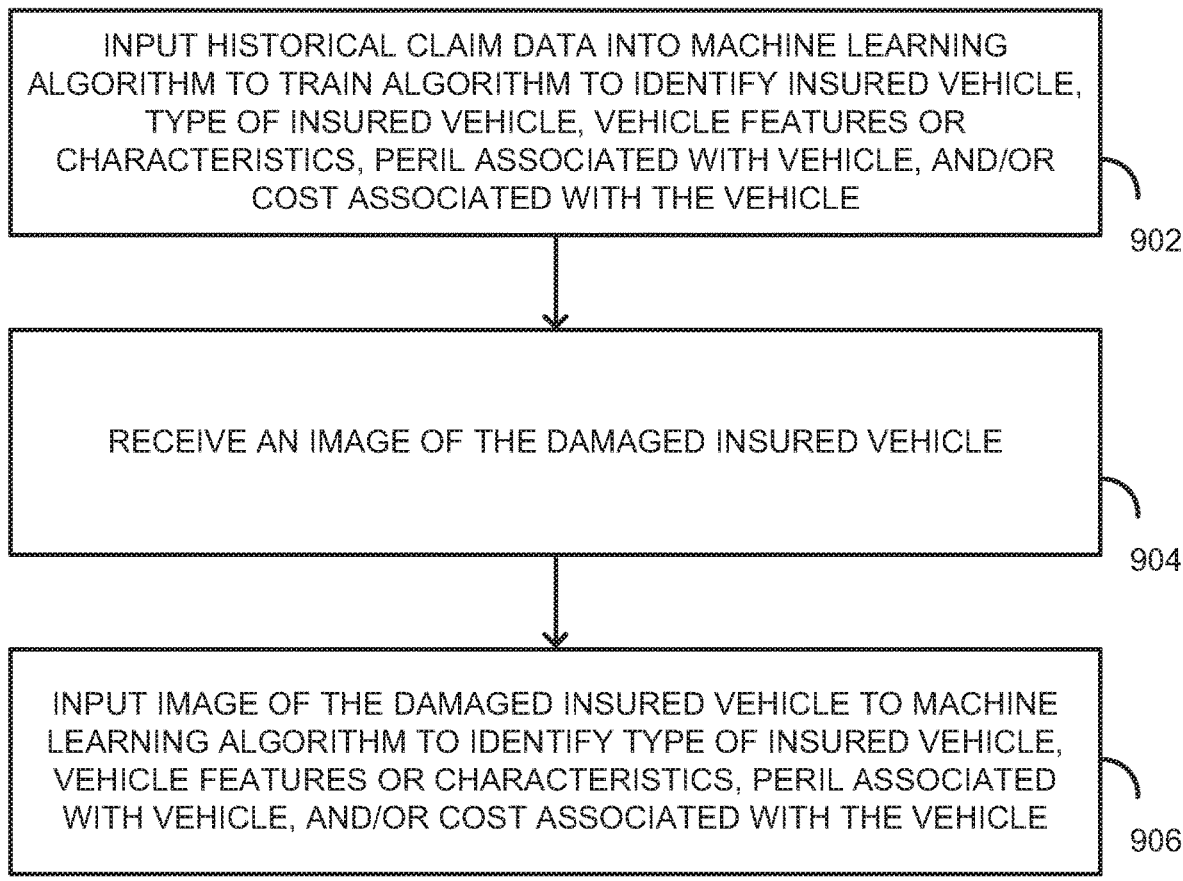
FIG. 9A is an example flow diagram depicting an exemplary computer-implemented method of determining damage to personal property, according to one embodiment.

FIG. 9A is an example flow diagram depicting an exemplary computer-implemented method 900 of determining damage to personal property, according to one embodiment. The method 900 may include inputting historical claim data into a machine learning algorithm, or model, to train the algorithm to identify an insured vehicle, a type of insured vehicle, vehicle features or characteristics, a peril associated with the vehicle, and/or a cost associated with the vehicle (block 902). The method 900 may be implemented by a processor (e.g., processor 250) executing, for example, a portion of AI platform 104, including input analysis unit 120, and/or otherwise implemented via, for instance, one or more processors, sensors, servers, and/or transceivers. Processor 250 may execute an input analysis application 260 to cause processor 250 to receive an image of the damaged insured vehicle (block 904).

The method may further include inputting an image of the damaged insured vehicle into the trained machine learning algorithm to identify a type of insured vehicle, vehicle features or characteristics, peril associated with the vehicle, and/or a cost associated with the vehicle. A type of vehicle may include any attribute of the vehicle, including without limitation, whether the body type (e.g., coupe, sedan), make, model, model year, options (e.g., sport package), whether the vehicle is autonomous or not, etc. In some embodiments, the features and characteristics may include an indication of whether the vehicle includes autonomous or semi-autonomous technologies or systems. In some embodiments, the peril associated with the damaged insured vehicle may comprise collision, comprehensive, fire, water, smoke, hail, wind, or storm surge.

In one embodiment, an insurance policy associated with the damaged insured vehicle may be retrieved by AI platform 104, for example, from customer data 160, and the type of peril compared to the insurance policy to determine whether or not the peril is a covered peril under the insurance policy. As noted above, the applicable policy may be identified by a user identification passed from a client device, but in some embodiments, the applicable policy may be identified by other means. For example, a VIN number or license plate may be digitized by optical character recognition (e.g., by image processing unit 124) from the image provided to the AI platform 104, and the digitization used to search customer data 160 for a matching insurance policy.

Figure 9B:
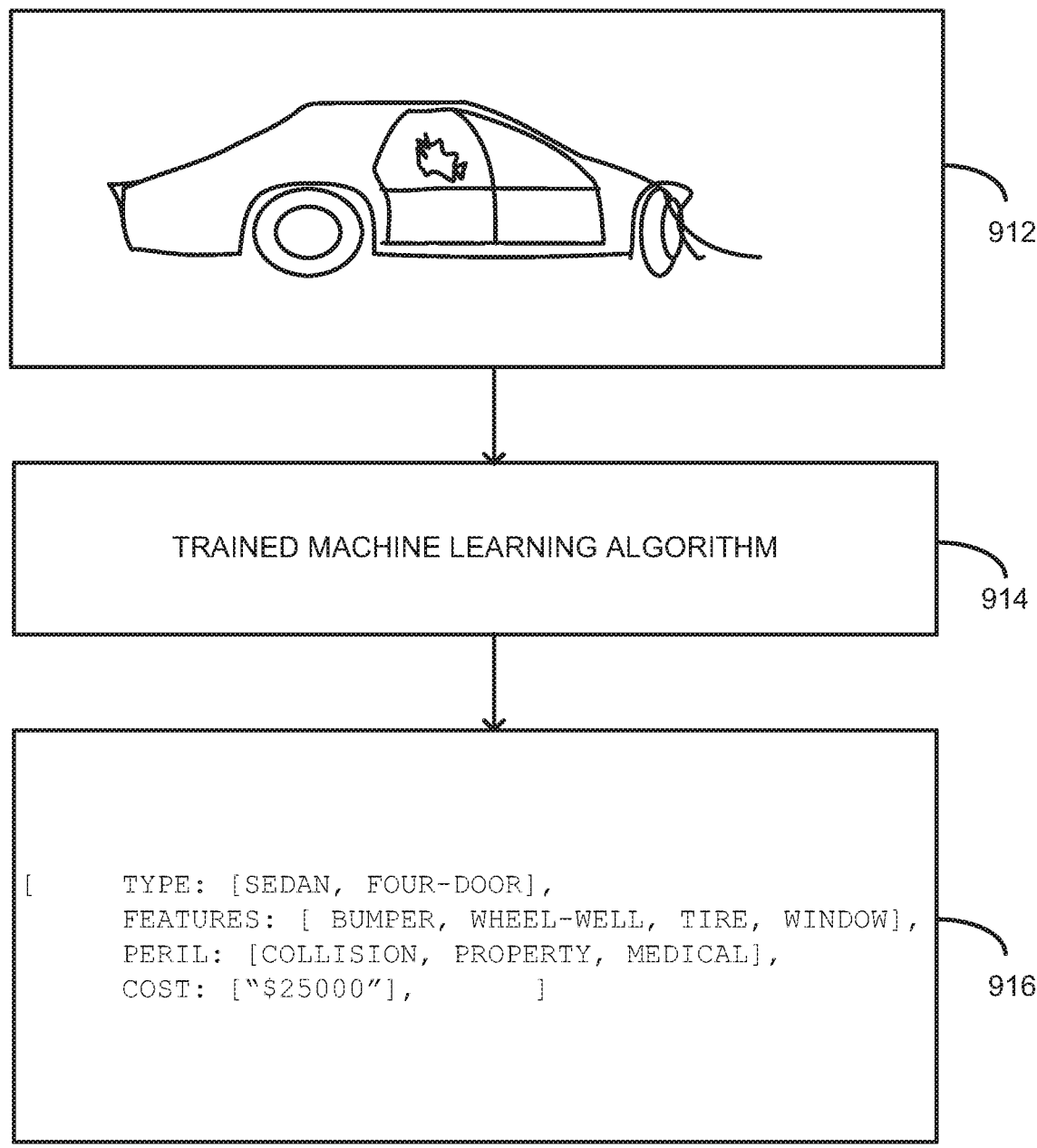
FIG. 9B is an example data flow diagram depicting an exemplary computer-implemented method of determining damage to an insured vehicle using a trained machine learning algorithm to facilitate handling an insurance claim associated with the damaged insured vehicle, according to one embodiment.

FIG. 9B is an example data flow diagram depicting an exemplary computer-implemented method 910 of determining damage to an insured vehicle using a trained machine learning algorithm to facilitate handling an insurance claim associated with the damaged insured vehicle, according to one embodiment. The method 910 may be implemented, for instance, via one or more processors, sensors, servers, transceivers, and/or other computing or electronic devices.

The method 910 may include receiving a photograph of a damaged insured vehicle 912. The image may be received by, for example, image processing unit 124 of AI platform 104. The image may originate in a sensor of a client device, such as image sensor 220 of client device 202, and may be captured in response to an action taken by a user, such as the user pressing a user interface button (e.g., a button or screen element of input device 222). The photograph may be analyzed by image processing unit 124 (e.g., sharpened, contrasted, or converted to a dot matrix) before being passed to neural network unit 150, where it may be input to a trained machine learning algorithm, or neural network model (block 914). The trained neural network model in block 914 may correspond to the machine learning algorithm trained in block 904 of FIG. 9A. The method may include identifying information 916 which may include a type of the damaged insured vehicle, a respective feature or characteristic of the damaged insured vehicle, a peril associated with the damaged insured vehicle, and/or a repair or replacement cost associated with the damaged insured vehicle. The information 916 may be used to facilitate handling an insurance claim associated with the damaged insured vehicle.

Figure 10A:
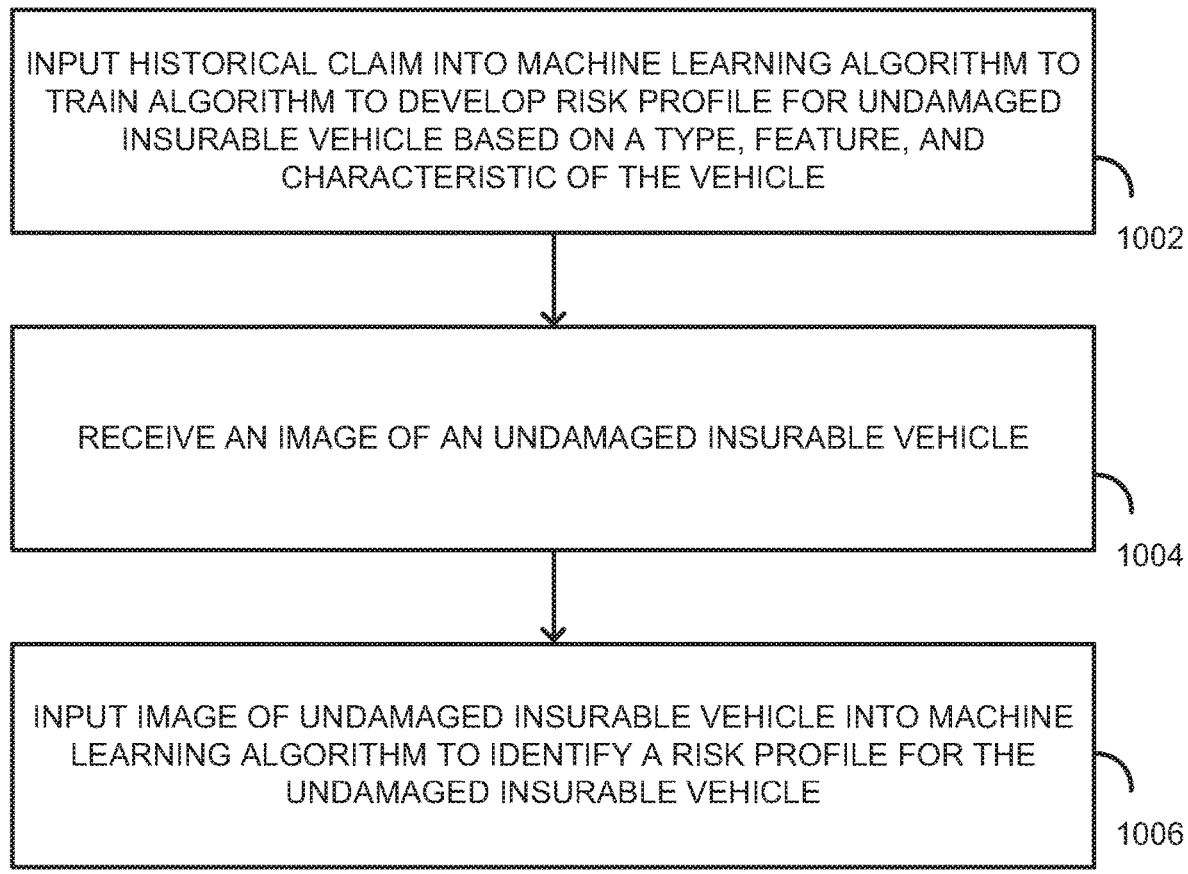
FIG. 10A is an example flow diagram depicting an exemplary computer-implemented method for determining damage to personal property, according to one embodiment.

FIG. 10A is an example flow diagram depicting an exemplary computer-implemented method 1000 for determining damage to personal property, according to one embodiment. The method 1000 may be implemented, for instance, via one or more processors, sensors, servers, transceivers, and/or other computing or electronic devices.

The method 1000 may include inputting historical claim information into a machine learning algorithm, or model, to train the algorithm to develop a risk profile for an undamaged insurable vehicle based upon a type, feature, and/or characteristic of the vehicle (block 1002). The type, feature, and/or characteristic of the vehicle may include an indication of the geographic area of the vehicle, the vehicle make or model, information about the vehicle's transmission, information about the type and condition of the vehicle's tires, information about the vehicle's engine, information pertaining to whether the vehicle includes autonomous or semi-autonomous features, information about the vehicle's air conditioning or lack thereof, information specifying whether the vehicle has power brakes and windows, and the color of the vehicle. The method may further include receiving an image of an undamaged insurable vehicle (block 1004). The method may further include inputting the image of the undamaged insurable vehicle into a machine learning algorithm to identify a risk profile for the undamaged insurable vehicle (block 1006).

A risk profile may include a predicted loss amount, likelihood of loss, or a risk relative to other vehicles. For example, for a minivan may be lower than a risk profile for a sports car. Similarly, the risk of being rear-ended in a sports car may be lower than the risk of being rear-ended in a minivan. A risk profile may also include multiple risks with respect to one or more peril (e.g., respective risks for collision, liability, and comprehensive) in addition to an overall, or aggregate, risk profile.

Figure 10B:
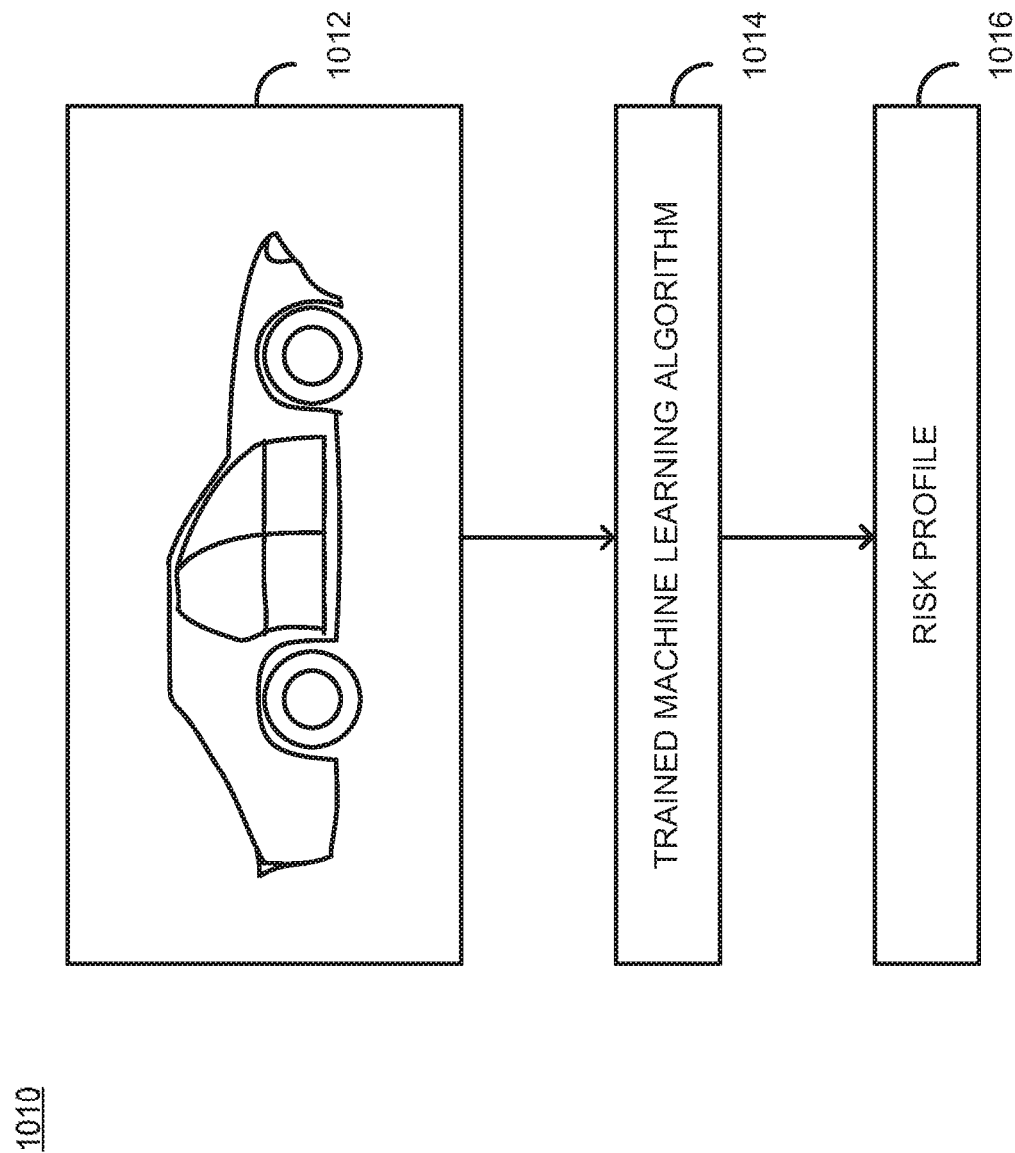
FIG. 10B is an example data flow diagram depicting an exemplary computer-implemented method of determining damage to an undamaged insurable vehicle using a trained machine learning algorithm to facilitate generating an insurance quote for the undamaged insurable vehicle, according to one embodiment.

FIG. 10B is an example data flow diagram depicting an exemplary computer-implemented method 1010 of using a trained machine learning algorithm to facilitate generating an insurance quote for an undamaged insurable vehicle, according to one embodiment. The method 1010 may be implemented, for instance, via one or more processors, sensors, servers, transceivers, and/or other computing or electronic devices.

The method may include receiving an image, or photograph, of an undamaged vehicle 1012. The photograph may originate in a client device, such as client 202, and may be captured and transmitted to a server via the methods described above. The method 1010 may include inputting the image of an undamaged vehicle into a trained machine learning algorithm 1014. The trained neural network may correspond to the neural network trained block 1002 of FIG. 10A, and the machine learning algorithm may be trained using historical claim information corresponding to historical data 108 of FIG. 1. The neural network may be configured to accept historical claim data and to predict damage amounts, or other risks.

The method may include inputting the image of the undamaged insurable vehicle into the trained machine learning algorithm to identify a risk profile for the undamaged insurable vehicle, wherein the risk profile may correspond to the risk profile described above with respect to block 1006. It should be appreciated that the use of neural networks may cause variables to emerge from large data sets that are not expected, but which are highly correlated to risk. In some cases, the risk profile associated with a given vehicle may contain information that seems unforeseeable and/or counter-intuitive.

In one embodiment, the risk profile described above may be used to generate an insurance policy and/or determine a rate quotation corresponding to the undamaged insurable vehicle wherein the policy and/or rate are based upon the risk profile. In one embodiment, the rate may include a usage-based insurance (UBI) rate. In some embodiments, the generated insurance policy and/or rate quotation may be transmitted to the vehicle owner for a review and/or approval process. For example, a user of client device 202 may submit an image of their vehicle via processor 210 and module 212, and the above-described analysis involving the trained neural network model may then take place on server 204. Then, when a rate quote or policy is generated on the server, the quote or policy may be transmitted by network interface 256 to network 206 and ultimately to network interface 214, back on the client.

The client may include an application in module 212 which causes the policy or rate to be displayed to the user of client 202 (e.g., via display 224), and the user may review the policy/quote, and may be prompted to enter (e.g., via input device 222) their approval with the terms of the policy/quote. The user's approval may be transmitted back to the server 204 via network 206, and a contract for insurance formed. In this way, a user may successfully register for an insurance policy covering an insurable vehicle, by capturing an image of the vehicle, uploading the image of that vehicle, and reviewing a policy corresponding to that vehicle that has been generated by a neural network model analyzing the image, wherein the neural network model has been trained on historical claim data and/or images of similar vehicles, according to at least one preferred embodiment.

Although the present invention has been described in considerable detail with reference to certain preferred versions thereof, other versions are possible, which may include additional or fewer features. For example, additional knowledge may be obtained using identical methods. The labeling techniques described herein may be used in the identification of fraudulent claim activity. The techniques may be used in conjunction with co-insurance to determine the relative risk of pools of customers. External customer features, such as payment histories, may be taken into account in pricing risk. Therefore, the spirit and scope of the appended claims should not be limited to the description of the preferred versions described herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on drones, vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. For instance, machine learning may involve identifying and recognizing patterns in existing text or voice/speech data in order to facilitate making predictions for subsequent data. Voice recognition and/or word recognition techniques may also be used. Models may be created based upon example inputs in order to make valid and reliable predictions for novel inputs.

Additionally or alternatively, the machine learning programs may be trained by inputting sample data sets or certain data into the programs, such as drone, autonomous or semi-autonomous drone, image, mobile device, vehicle telematics, smart or autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Exemplary Embodiments

In one aspect, a computer-implemented method of detecting and/or estimating damage may be provided. The method may include (1) receiving, via one or more processors and/or associated transceivers (such as via wireless communication or data transmission over one or more radio links or communication channels), free form text or free form speech associated with a submitted insurance claim or a damage insured asset (such as home or vehicle), for instance the free form text or free form speech may be associated with, or input via, a webpage accessed by a customer or insurance agent, or an intranet page accessed by a call center representative; (2) identifying, via one or more processors, one or more key words within the free form text or free form speech; and/or (3) based upon the one or more keywords, determining, via one or more processors, a cause of loss and/or peril that caused damage to the damaged insured asset to facilitate handling insurance claims and enhancing the online customer experience. The method may include additional, less, or alternate actions, including those discussed elsewhere herein.

For instance, the damaged insured asset may be a home, and the cause of loss and/or peril may be wind, water, storm surge, smoke, fire, hail, hurricane, or tornado. The damaged insured asset may an autonomous or semi-autonomous vehicle, and the cause of loss may be related to a collision or comprehensive (non-vehicle collision) cause of loss. For vehicles, the cause of loss may include animals, such as deer, and the damage may relate to one or more damaged or worn out sensors or other electronic components.

Identifying, via one or more processors, one or more key words within the free form text may include inputting the free form text or free form text into a processor having a machine learning algorithm trained accept the free form text or free form speech and/or type of insured asset as input, and then identify key words associated with cause of loss and/or insurance perils. The machine learning algorithm may be dynamically or continuously updated or trained to dynamically update the key words associated with cause of loss and/or insurance perils.

Determining, via one or more processors, a cause of loss and/or peril that caused damage based upon the one or more key words may include inputting the free form text or free form speech into a processor having a machine learning algorithm trained to accept one or more key words and/or type of insured asset as input, and then identify a cause of loss and/or peril based upon the one or more key words and/or type of insured asset. The machine learning algorithm may be dynamically or continuously updated or trained to dynamically update the causes of loss and/or perils.

The method may include receiving, via one or more processors and/or transceivers (such as via wireless communication or data transmission over one or more radio links or communication channel), images of the damaged insured asset (such as images submitted by the insured via a webpage); analyzing, via one or more processors, the images of the damaged insured asset to determine a second cause of loss and/or second peril, and/or comparing, via one or more processors, the second cause of loss and/or second peril with the cause of loss and/or peril associated with the submitted insurance claim, respectively, to verify the accuracy of the submitted insurance claim, or identify potential fraud or buildup.

The method may include receiving, via one or more processors and/or transceivers (such as via wireless communication or data transmission over one or more radio links or communication channel), images of the damaged insured asset (such as images submitted by the insured via a webpage); and/or analyzing, via one or more processors, the images of the damaged insured asset to estimate damages and/or a repair or replacement cost.

Analyzing, via one or more processors, the images of the damaged insured asset to estimate damages and/or a repair or replacement cost for the insured asset may include inputting the images into a processor having a machine learning algorithm trained to accept the images of a damage insured asset as input, and estimate damages and/or repair/replacement cost for the insured asset.

The method may include retrieving or receiving, via one or more processors, an insurance policy associated with the insured asset; and/or determining, via one or more processors, whether the cause of loss and/or peril is covered under the insurance policy.

The damaged insured asset may be a vehicle, such as a smart or autonomous vehicle, and the cause of loss and/or peril may be, or may be associated with, collision, comprehensive, bodily injury, property damage, liability, or medical. Additionally or alternatively, the damaged insured asset may be a vehicle, such as a smart or autonomous vehicle, and the one or more key words may be, or may be associated with collision, comprehensive, bodily injury, property damage, liability, medical, rental, towing, or ambulance.

The damaged insured asset may be a home or vehicle, and the one or more key words may be, or may be associated with, fire, smoke, wind, hail, water, storm surge, tornado, hurricane, electrical, plumping, property damage, liability, medical, ambulance, materials, cabinets, fireplace, bathroom, bedroom, kitchen, upstairs, roof, downstairs, basement, structural, security system, appliance, refrigerator, washer, dryer, oven, stove, and/or lightning.

In another aspect, a computer-implemented method of determining damage to property may be provided. The method may include (1) inputting, via one or more processors, historical claim data into a machine learning algorithm to train the algorithm to identify an insured asset (or type thereof), insured asset features or characteristics, a peril, and/or a repair or replacement cost; (2) receiving, via one or more processors and/or transceivers (such as via wireless communication or data transmission over one or more radio links or communication channel), images of the damaged insured asset (such as images submitted by the insured via a webpage); and/or (3) inputting, via one or more processors, the images of the damaged insured asset into a processor having the trained machine learning algorithm installed in a memory unit, the trained machine learning algorithm identifying a type of the damaged insured asset, features or characteristics of the damaged insured asset, a peril, and/or a repair or replacement cost to facilitate handling an insurance claim associated with the damaged insured asset. The method may include additional, less, or alternate actions, including those discussed elsewhere herein.

For instance, the damaged insured asset may be a vehicle, and the features or characteristics of the damaged insured asset include one or more autonomous or semi-autonomous technologies or systems. Additionally or alternatively, the damaged insured asset may be a vehicle, and the features or characteristics of the damaged insured asset include one or more autonomous or semi-autonomous technologies or systems, and/or the peril is collision, comprehensive, fire, or water.

The method may include retrieving, via one or more processors, an insurance policy associated with the damaged insured asset; and/or determining, via one or more processors, whether the peril is a covered peril under the insurance policy.

In another aspect, a computer system configured to detect and/or estimate damage may be provided. The system may include one or more processors, sensors, transceivers, and/or servers configured to: (1) receive (such as via wireless communication or data transmission over one or more radio links or communication channels) free form text or free form speech associated with a submitted insurance claim or a damage insured asset (such as home or vehicle, which may be an autonomous vehicle), for instance the free form text or free form speech may be associated with a webpage or website accessed by a customer or insurance agent, or an intranet page accessed by a call center representative; (2) identify one or more key words within the free form text or free form speech; and/or (3) based upon the one or more keywords, determine a cause of loss and/or peril that caused damage to the damaged insured asset to facilitate handling insurance claims and enhancing the online customer experience. The computer system may include additional, less, or alternative functionality, including that discussed elsewhere herein.

For instance, the system is further configured to: receive (such as via wireless communication or data transmission over one or more radio links or communication channel), images of the damaged insured asset (such as images submitted by the insured via a webpage); analyze the images of the damaged insured asset to determine a second cause of loss and/or second peril; and/or compare the second cause of loss and/or second peril with the cause of loss and/or peril associated with the submitted insurance claim, respectively, to verify the accuracy of the submitted insurance claim, or identify potential fraud or buildup.

The system may be further configured to: receive (such as via wireless communication or data transmission over one or more radio links or communication channel) images of the damaged insured asset (such as images submitted by the insured via a webpage, website, and/or mobile device); and/or analyze the images of the damaged insured asset to estimate damages and/or a repair or replacement cost.

In another aspect, a computer system configured to determine damage to property may be provided. The system may include one or more processors, servers, sensors, and/or transceivers configured to: (1) input historical claim data into a machine learning algorithm to train the algorithm to identify an insured asset (or type thereof), insured asset features or characteristics, a peril, and/or a repair or replacement cost; (2) receive (such as via wireless communication or data transmission over one or more radio links or communication channel), images of the damaged insured asset (such as images submitted by the insured via a webpage); and/or (3) input the images of the damaged insured asset into a processor having the trained machine learning algorithm installed in a memory unit, the trained machine learning algorithm identifying a type of the damaged insured asset, features or characteristics of the damaged insured asset, a peril, and/or a repair or replacement cost to facilitate handling an insurance claim associated with the damaged insured asset. The system may include additional, less, or alternative functionality, including that discussed elsewhere herein.

In another aspect, a computer system configured to determine damage to property may be provided. The system may include one or more processors, servers, sensors, and/or transceivers configured to: (1) input historical claim data into a machine learning algorithm to train the algorithm to develop a risk profile for an insurable asset based upon type of insurable asset and insurable asset features or characteristics; (2) receive (such as via wireless communication or data transmission over one or more radio links or communication channel), images of an undamaged insurable asset (such as images submitted by the insured via a webpage); and/or (3) input the images of the undamaged insurable asset into a processor having the trained machine learning algorithm installed in a memory unit, the trained machine learning algorithm identifying or determining a risk profile for the insurable asset to facilitate generating an insurance quote for the insurable asset. The system may include additional, less, or alternative functionality, including that discussed elsewhere herein.

The insurable asset may be a home, and the features or characteristics may include location, square footage, cabinet type, roof type, siding type, type of fireplace, type of windows, and/or material type, and/or other home features or characteristics.

The insurable asset may be a vehicle, and the features or characteristics include geographical area, make, model, transmission, tire, engine, autonomous or semi-autonomous features, types of sensors or electronic components, versions of software (such as software directing or controlling autonomous or semi-autonomous features or technologies), air conditioning, power brakes, power windows, and/or color of the vehicle, and/or other vehicle features or characteristics.

The system may be configured to generate an insurance policy and/or determine an insurance rate, including a usage-based insurance (UBI) rate, for the insurable asset based at least in part upon the risk profile developed for the insurable asset; and/or transmit the insurance policy and/or insurance rate to an asset owner for review and/or approval.

In another aspect, a computer-implemented method for determining damage to property may be provided. The method may include, via one or more processors, servers, sensors, and/or transceivers configured to: (1) inputting historical claim data into a machine learning algorithm to train the algorithm to develop a risk profile for an insurable asset based upon type of insurable asset and insurable asset features or characteristics; (2) receiving (such as via wireless communication or data transmission over one or more radio links or communication channel) images of an undamaged insurable asset (such as images submitted by the insured via a webpage); and/or (3) inputting the images of the undamaged insurable asset into a processor having the trained machine learning algorithm installed in a memory unit, the trained machine learning algorithm identifying or determining a risk profile for the insurable asset to facilitate generating an insurance quote for the insurable asset. The method may include additional, less, or alternate actions, including those discussed elsewhere herein.

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart or autonomous vehicle controller, smart home controller, or other smart devices). In return, the user may be entitled insurance cost savings, including insurance discounts for auto, homeowners, mobile, renters, personal articles, and/or other types of insurance. In the above description, neural networks may also refer to other methods of artificial intelligence and machine learning.

In other embodiments, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2).

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for a system and a process of performing the methods and systems disclosed herein, using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer system comprising one or more processors, sensors, transceivers, and/or servers, the computer system configured to:
   receive or retrieve free-form text associated with a submitted insurance claim for a damaged insured vehicle;
   identify one or more key words composing the free-form text using a natural language processing model;
   input the identified one or more key words to a trained machine learning model;
   generate one or more labels by the trained machine learning model based on the one or more key words;
   assign one or more label weights by the trained machine learning model, each label weight of the one or more label weights being associated with a label of the one or more labels, a first label weight associated with a first label being increased based at least in part upon a second label being included in the one or more labels; and
   based upon the one or more labels and the one or more label weights, determine a cause of loss that caused damage to the damaged insured vehicle to facilitate handling an insurance claim.

2. The computer system of claim 1, wherein the free-form text is associated with one or both of (i) a webpage or website accessed by a customer or insurance agent, and (ii) an intranet page accessed by a call center representative.

3. The computer system of claim 1, wherein the computer system is further configured to: input a type of the damaged insured vehicle to the trained machined learning model to generate the one or more labels.

4. The computer system of claim 1, wherein the trained machine learning algorithm model is configured to dynamically update a set of key words associated with the cause of loss.

5. The computer system of claim 1, wherein the computer system is further configured to: determine the cause of loss using the trained machine learning model based at least in part upon a type of the damaged insured vehicle.

6. The computer system of claim 1, wherein the machine learning model is dynamically or continuously updated or trained to dynamically update a set of causes of loss.

7. The computer system of claim 1, wherein the cause of loss corresponding to the damaged insured vehicle is a first cause of loss, and the system is further configured to:

receive or retrieve a digital image of the damaged insured vehicle, the digital image submitted by an insured entity via a webpage, website, or mobile device;

analyze the image of the damaged insured vehicle to determine a second cause of loss; and compare the second cause of loss with the first cause of loss associated with the submitted insurance claim, respectively, to verify the accuracy of the submitted insurance claim, or identify potential fraud or buildup.

8. The computer system of claim 1, wherein the system is further configured to:

receive a digital image of the damaged insured vehicle, the digital image submitted by an insured entity via a webpage, website, or mobile device; and analyze the image of the damaged insured vehicle to estimate respective damages and/or a repair or replacement cost associated with the damaged insured vehicle.

9. The computer system of claim 8, wherein the analysis of the image of the damaged insured vehicle to estimate the damages and/or a repair or replacement cost associated with the damaged insured vehicle comprises inputting the image into a second machine learning model to estimate one or both of (i) respective damages, and (ii) a repair/replacement cost corresponding to the damaged insured vehicle.

10. The computer system of claim 1, wherein the system is further configured to:

retrieve or receive an insurance policy associated with the damaged insured vehicle;

and determine whether or not the cause of loss is covered under the insurance policy.

11. The computer system of claim 1, wherein the cause of loss comprises collision, comprehensive, bodily injury, property damage, liability, or medical.

12. The computer system of claim 1, wherein the one or more key words comprise collision, comprehensive, bodily injury, property damage, liability, medical, rental, towing, or ambulance.

* * * * *